United States Patent
Yamada et al.

(10) Patent No.: US 9,411,216 B2
(45) Date of Patent: Aug. 9, 2016

(54) PROJECTOR WITH INTAKE DUCTS PROVIDED IN A CASE THEREOF

(71) Applicants: Masamichi Yamada, Kanagawa (JP); Tetsuya Fujioka, Kanagawa (JP); Naoyuki Ishikawa, Kanagawa (JP); Akihisa Mikawa, Kanagawa (JP); Hideo Kanai, Tokyo (JP); Yasunari Mikutsu, Tokyo (JP); Satoshi Tsuchiya, Kanagawa (JP)

(72) Inventors: Masamichi Yamada, Kanagawa (JP); Tetsuya Fujioka, Kanagawa (JP); Naoyuki Ishikawa, Kanagawa (JP); Akihisa Mikawa, Kanagawa (JP); Hideo Kanai, Tokyo (JP); Yasunari Mikutsu, Tokyo (JP); Satoshi Tsuchiya, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 107 days.

(21) Appl. No.: 14/313,134

(22) Filed: Jun. 24, 2014

(65) Prior Publication Data

US 2015/0015851 A1    Jan. 15, 2015

(30) Foreign Application Priority Data

Jul. 9, 2013  (JP) ................................. 2013-143406

(51) Int. Cl.
*G03B 21/16* (2006.01)
*G03B 21/14* (2006.01)
(Continued)

(52) U.S. Cl.
CPC .............. *G03B 21/16* (2013.01); *G02B 7/1815* (2013.01); *G02B 17/0848* (2013.01); *G03B 21/145* (2013.01); *G03B 21/28* (2013.01); *H04N 9/3144* (2013.01)

(58) Field of Classification Search
CPC ...... G03B 21/16; G03B 21/145; G03B 21/28; G02B 7/1815; G02B 17/0848; H04N 9/3144
See application file for complete search history.

(56) References Cited

U.S. PATENT DOCUMENTS

| | | | |
|---|---|---|---|
| 6,488,378 B1* | 12/2002 | Tabuchi | G03B 21/16 353/52 |
| 2004/0165152 A1* | 8/2004 | Ito | G03B 21/16 353/30 |

(Continued)

FOREIGN PATENT DOCUMENTS

| | | |
|---|---|---|
| CN | 102207664 A | 10/2011 |
| EP | 2 590 414 A2 | 5/2013 |

(Continued)

OTHER PUBLICATIONS

The Extended European Search Report issued Dec. 12, 2014, in Application No. / Patent No. 14175652.8-1560.

(Continued)

*Primary Examiner* — Toan Ton
*Assistant Examiner* — Magda Cruz
(74) *Attorney, Agent, or Firm* — Oblon, McClelland, Maier & Neustadt, L.L.P.

(57) ABSTRACT

In a projector that includes a light source, an image forming unit, a projection optical unit, and a case to contain the light source, the image forming unit, the projection optical unit, and the power supply, takes outside air in through a first intake duct provided on the case, cools the power supply by circulating the taken outside air to the power supply circumventing the projection optical unit, and exhausts the air after cooling through an exhaust vent provided on the case. A second intake duct is provided nearby the power supply compared to the first intake duct, and the amount of outside air drawn into the case through the second intake duct is larger than the amount of outside air drawn into the case through the first intake duct.

7 Claims, 23 Drawing Sheets

(51) Int. Cl.
*G03B 21/28* (2006.01)
*G02B 7/18* (2006.01)
*G02B 17/08* (2006.01)
*H04N 9/31* (2006.01)

(56) References Cited

U.S. PATENT DOCUMENTS

| | | |
|---|---|---|
| 2005/0201107 A1 | 9/2005 | Seki |
| 2011/0234991 A1 | 9/2011 | Nagumo et al. |
| 2012/0176586 A1 | 7/2012 | Nishimura et al. |
| 2013/0114045 A1 | 5/2013 | Fujioka et al. |
| 2013/0114052 A1 * | 5/2013 | Fujioka .................. G03B 21/28 353/98 |
| 2013/0242270 A1 | 9/2013 | Tsukioka et al. |

FOREIGN PATENT DOCUMENTS

| | | |
|---|---|---|
| JP | 2006-72036 | 3/2006 |
| JP | 2006-343566 A | 12/2006 |
| JP | 2007-316674 A | 12/2007 |
| JP | 2013-097340 A | 5/2013 |

OTHER PUBLICATIONS

Office Action issued on Aug. 5, 2015 in the corresponding Chinese Patent Application No. 201410325241.3.

* cited by examiner

PROJECTOR WITH INTAKE DUCTS PROVIDED IN A CASE THEREOF

CROSS-REFERENCE TO RELATED APPLICATION

This patent application is based on and claims priority pursuant to 35 U.S.C. §119(a) to Japanese Patent Application No. 2013-143406, filed on Jul. 9, 2013 in the Japan Patent Office, the entire disclosure of which is hereby incorporated by reference herein.

BACKGROUND

1. Technical Field

The present invention relates to a projector.

2. Background Art

Conventionally, projectors that include an image forming unit that comprises an image generating device that modulates light based on image data transferred from personal computers, etc., and an illuminating unit that illuminate the image generating device with light from a light source are known. For those projectors, the image forming unit forms images, and those images formed by the image forming unit are projected onto a projection surface using a projection optical unit.

The projectors include heat generating devices such as the image generating device, the light source, and a power supply, etc. A projector that circulates air through the image generating device, the light source, and the power supply and cools them down has been proposed. (e.g., JP-2013-097340-A).

FIG. 22 is a schematic perspective diagram illustrating an internal configuration of the projector described in JP-2013-097340-A.

As shown in FIG. 22, the projector described in JP-2013-097340-A includes a light modulator 10 that includes the image generating device 12 and an illuminating unit 20 that illuminates the image generating device 12 as the image forming unit with light from a light source 61. The illuminating unit 20 includes a color wheel 21, a light tunnel 22, two relay lenses 23, a cylinder mirror 24, and a concave mirror 25, all supported on a bracket 26.

In addition, the projector described in JP-2013-097340-A includes a first optical system 30 that holds a projection lens unit 31 and a second projection optical system 40 that holds a curved mirror 42 and a reflection mirror 41, etc. The projection lens unit 31 is supported on a lens holder 32, and the lens holder 32 is fixed on the upper surface of the bracket 26.

The light modulator 10, the illuminating unit 20, the first optical system 30, and the second projection optical system 40 are aligned along the Y-axis in FIG. 22. In addition, a light source unit 60 that includes a light source 61 is placed in the left side of the illuminating unit 20 in FIG. 22.

FIG. 23 is a perspective diagram illustrating the light modulator 10, the illuminating unit 20, the first optical system 30, and the second projection optical system 40 in the projector described in JP-2013-097340-A.

As shown in FIG. 23, the light modulator 10 is fixed on the lower surface of the bracket 26 in the illuminating unit 20, and the light modulator 10 includes a heat sink 13 that dissipates the heat that the image generating device gives off.

The second projection optical system 40 includes a mirror bracket 43 that holds the reflection mirror 41 and a dustproof glass window 51 that fills an aperture placed in a case (not shown) to project images on a screen, etc. In addition, the second projection optical system 40 includes a flexible mirror bracket 44 that holds the curved mirror 42 and a mirror mount 45 that mounts the mirror bracket 43 and the flexible mirror bracket 44. The second projection optical system 40 is fixed to the lens holder 32 in the first optical system 30.

As shown in FIG. 22, the projection lens unit 31 includes a focus gear 36 to focus, and a focus lever 33 shown in FIG. 23 is connected to the focus gear 36 via multiple gears (not shown in figures). In case of rotating the focus lever 33, the focus gear 36 is driven and rotated via the multiple gears to focus the image by moving multiple lenses held by the projection lens unit 31 in the y-axis direction. As shown in FIG. 22, there is a gap between the lower end of the curved mirror 42 and the lens holder 32, and the multiple gears described above are placed in the gap.

FIG. 24 is an elevational diagram illustrating airflow in the projector described in JP-2013-097340-A.

An intake duct 84 to take air into the interior of the apparatus in the one side of the projector (left side in FIG. 24) is provided, as is an exhaust vent 85 to exhaust air in the apparatus in the other side of the projector (right side in FIG. 24). An exhaust fan 86 is placed behind the exhaust vent 85.

In the lower left side of the main body of the apparatus in FIG. 24, a cooling unit 120 is provided to cool the heat sink 13 and the light source unit 60 etc. The cooling unit 120 includes an intake blower 191, a vertical duct 192, and a horizontal duct 93 connected to the lower part of the vertical duct 192. The intake blower 191 is placed below the intake duct 84. The intake blower 191 takes in outside air via the intake duct 84 as well as inside air inside the intake duct 84. The air taken in by the intake blower 191 flows to the vertical duct 192 placed below the intake blower 191. The air that flows in the vertical duct 192 moves below. Subsequently, the air is sent to the horizontal duct 93.

The heat sink 13 is placed inside the horizontal duct 93 and cooled by the air that flows inside the horizontal duct 93. The image generating device 12 can be cooled effectively by cooling the heat sink 13.

After moving through the horizontal duct 93, the air flows through the light source unit 60. Subsequently, after cooling the light source unit 60, the air flows through the exhaust duct 94 and is exhausted upon a light source exhaust duct 64C supported on a holder 64 that holds the light source 61. After that, the air flows through the space where the power supply 80 is placed in conjunction with the air exhausted from the light source exhaust duct 64.

In addition, the exhaust fan 86 also takes in outside air through the intake duct 84 that flows to the backside of the curved mirror 42 in the second projection optical system 40 shown in FIG. 23 and the backside of the reflection mirror 41 etc. Subsequently, the air moves toward an exhaust vent 85 alongside of the backside of the curved mirror 42 and the backside of the reflection mirror 41, and the air flows into the space above the light source unit 60 where the power supply 80 is placed. After being mixed with the high temperature air exhausted from the light source exhaust duct 64C described above, the air is exhausted from the exhaust duct 85.

SUMMARY

An example embodiment of the present invention provides a projector that can cool a power supply optimally without increasing noise. In the projector that includes a light source, an image forming unit, a projection optical unit, and a case to contain the light source, the image forming unit, the projection optical unit, and the power supply, takes outside air in the case through a first intake duct provided on the case, cools the power supply by circulating the taken outside air to the power supply circumventing the projection optical unit, and exhausts the air after cooling through an exhaust vent provided on the case, a second intake duct is provided nearby the power supply compared to the first intake duct, and the amount of outside air drawn into the case through the second intake duct is larger than the amount of outside air drawn into the case through the first intake duct.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
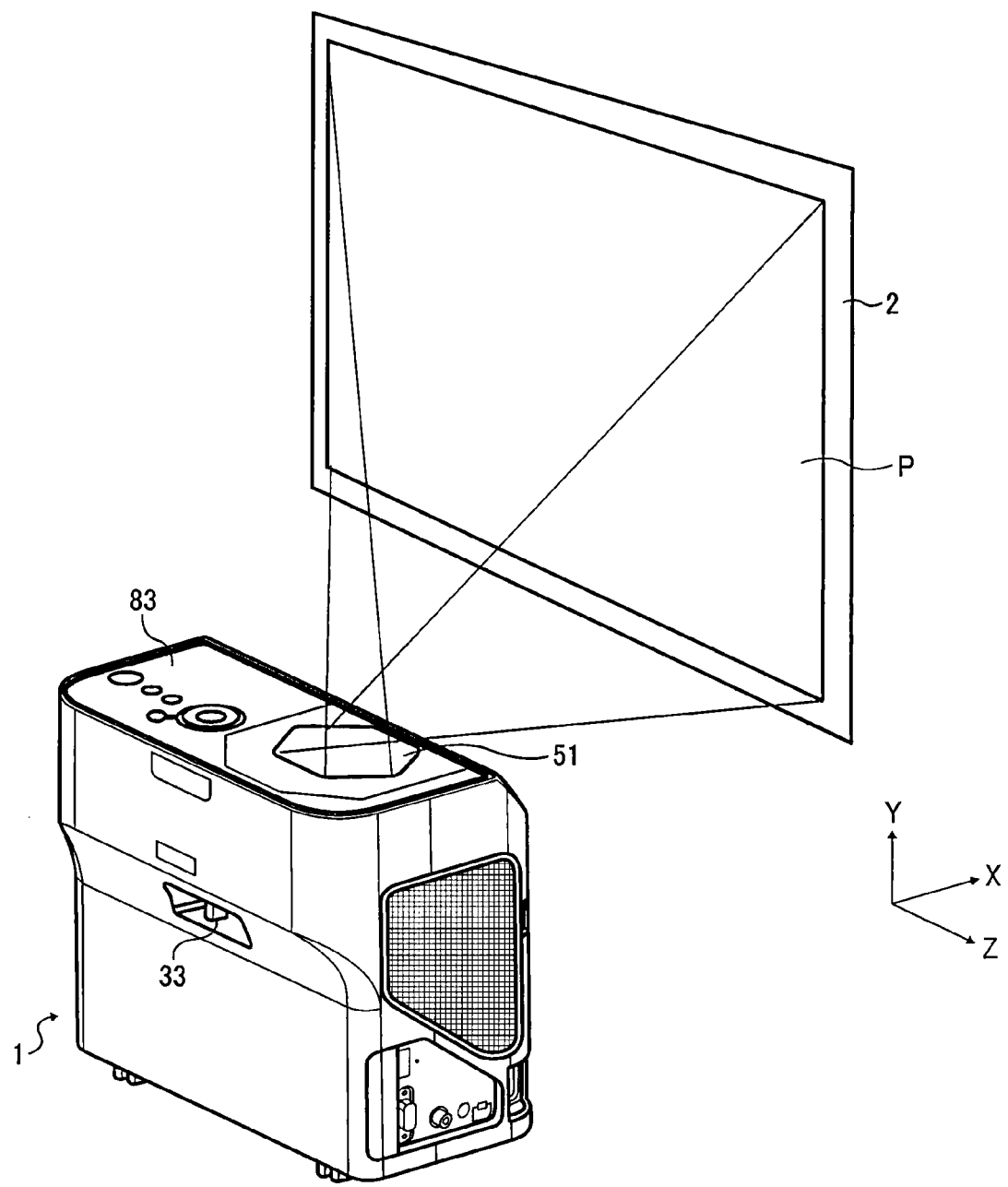
FIG. 1 is a perspective diagram illustrating a projector as an embodiment of the present invention and a projection surface.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the conventional projector described in JP-2013-097340-A, the inventor of the present invention made improvements that increases electric power supplied to the light source and brightness of the light source in order to improve the brightness of the projection images. However, in this case, a problem that heating values of the power supply 80 and the light source 61 increase due to the increase of the electric power supplied to the light source and it is difficult to cool the power supply 80 optimally occurred. To cope with this problem, it is possible to increase the rotating speed of the exhaust fan 86 and the amount of outside air taken in through the intake duct 84. However, in this case, the wind noise of the exhaust fan 86 becomes loud.

In the following embodiment, a projector that can cool the power supply optimally without increasing noise is provided.

FIG. 1 is a perspective diagram illustrating a projector 1 in this embodiment and a projection surface 2. In the following description, the normal direction of the projection surface 2 is considered the x direction, the minor axis direction (horizontal direction) of the projection surface 2 is considered the y direction, and the major axis direction (horizontal direction) of the projection surface 2 is considered the z direction.

The projectors forms projection images based on image data input from personal computers and video cameras etc. and projects the projection image P onto the projection surface 2 such as screens etc. In particular, liquid crystal projectors are improving brightness due to high-resolution liquid crystal panels and high-efficiency of a light source (lamp) and becoming less expensive recently. In addition, small and lightweight projectors 1 that adopt a Digital Micro-mirror Device (DMD) as a micro driving mirror device are becoming popular, and the projectors 1 are widely used not only in offices and schools but also in homes. The front-type projectors improve portability, and the front-type projectors are used at small meetings with several people. In these projectors, it is requested that not only images can be projected on the larger screen but also that required projection space outside of the projector be minimized. As described later, the projector 1 in this embodiment is configured laying out a transparent optical system such as a projection lens etc. parallel to the projection surface 2, reflecting a beam by the reflection mirror, and enlarging and projecting the beam onto the projection surface 2 with a sculptured surface mirror. In this configuration, it is possible to downsize the upright optical engine unit.

A dustproof glass window 51 from which a beam of a projection image P is projected is mounted on the upper surface of the projector 1, and the projection image P projected from the dustproof glass window 51 is projected onto the projection surface 2 such as a screen. In addition, a control panel 83 for operating the projector 1 by a user operation is mounted on the upper surface of the projector 1. A focus lever 33 for focusing is mounted on the side surface of the projector 1.

Figure 2A:
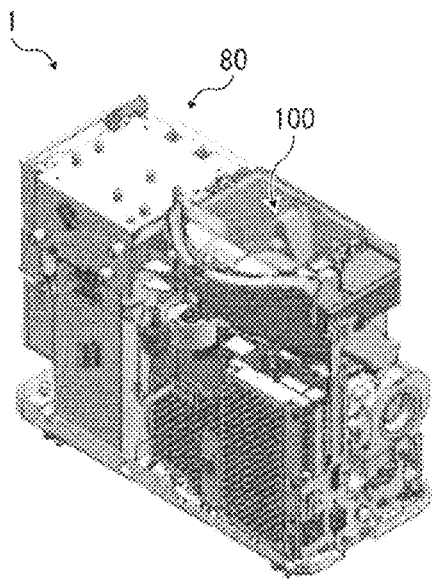
FIGS. 2A and 2B are perspective diagrams illustrating the interior of the projector with the cover removed.
Figure 2B:
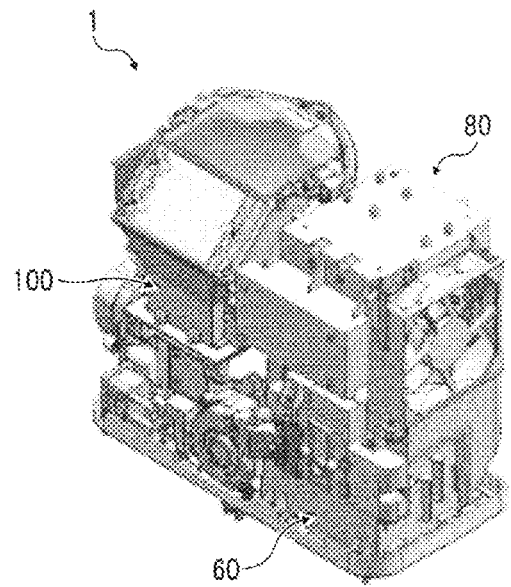

FIGS. 2A and 2B are perspective diagrams illustrating the interior of the projector 1 with the cover removed. FIG. 2A is a perspective diagram illustrating the interior of the projector from a viewpoint of the front side in FIG. 1, and FIG. 2B is a perspective diagram illustrating the interior of the projector viewed from the back side in FIG. 1.

Figure 3:
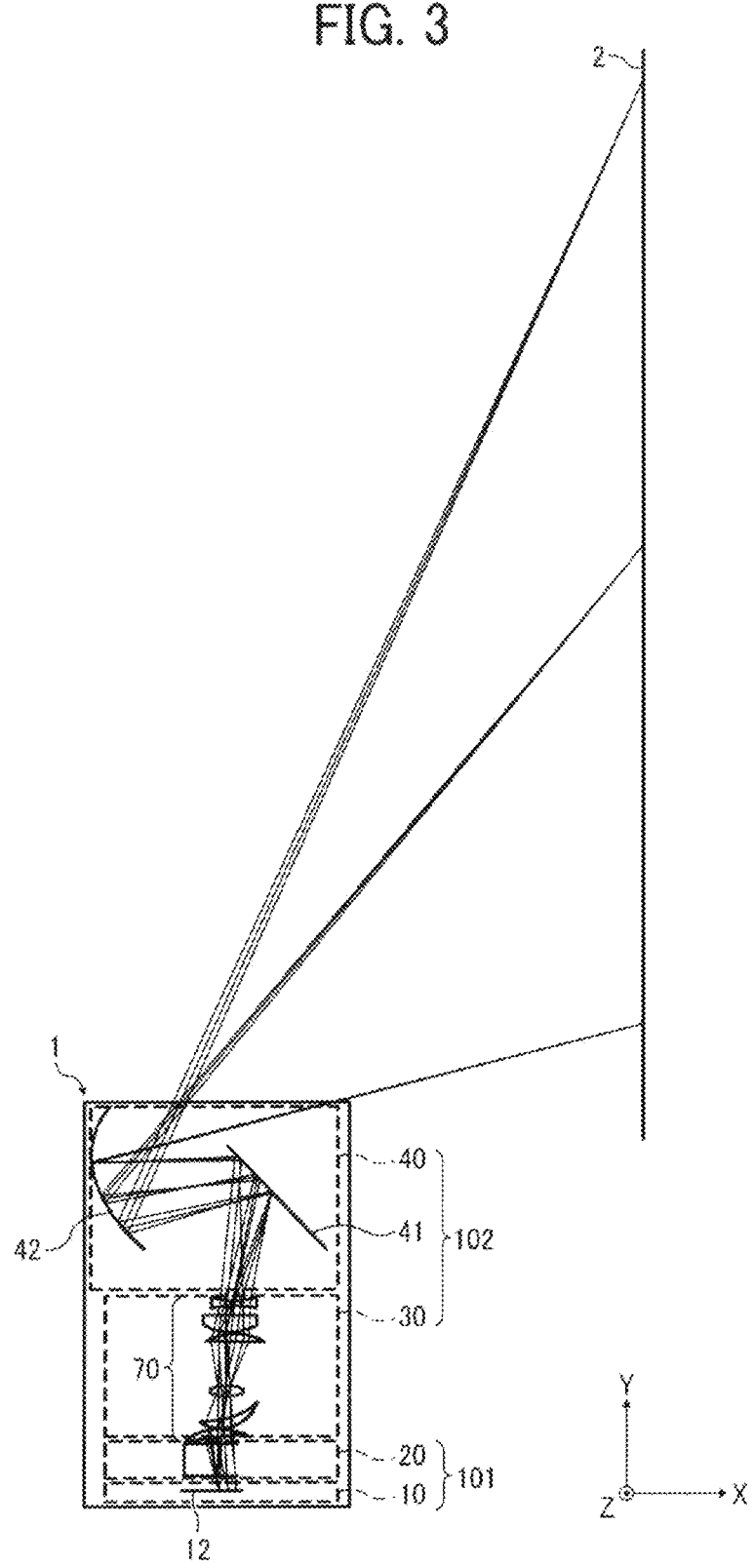
FIG. 3 is a diagram illustrating light path from the projector to the projection surface.

FIG. 3 is a diagram illustrating light path from the projector 1 to the projection surface 2.

The projector 1 includes an optical engine unit 100 and a light source unit 60 that includes a light source that generates white light. The optical engine unit 100 includes an image forming unit 101 that forms an image using the light from the light source and a projection optical unit 102 that projects beam of the image generated by the image forming unit 101 on the projection surface 2.

The image forming unit 101 includes a light modulator 10 that includes a DMD 12 as that includes multiple micro mirrors drivable to change the slope of the reflecting surface and a lighting unit 20 that reflects the light from the light source to the DMD 12. The projection optical unit 102 includes a first projection optical system 30 that includes a coaxial optical system 70 that has positive power and includes at least two transmissive refracting optical systems and a second projection optical system 40 that includes a reflecting mirror 41 and a curved mirror 42 that has positive power.

The lighting unit 20 illuminates the DMD 12 with the light from the light source and the DMD 12 generates an image by modulating the light emitted by the lighting unit 20. The optical image generated by the DMD 12 is projected onto the projection surface 2 via the optical system 70 in the first projection optical system 30 and the reflecting mirror 41 and the curved mirror 42 in the second projection optical system 40.

Figure 4:
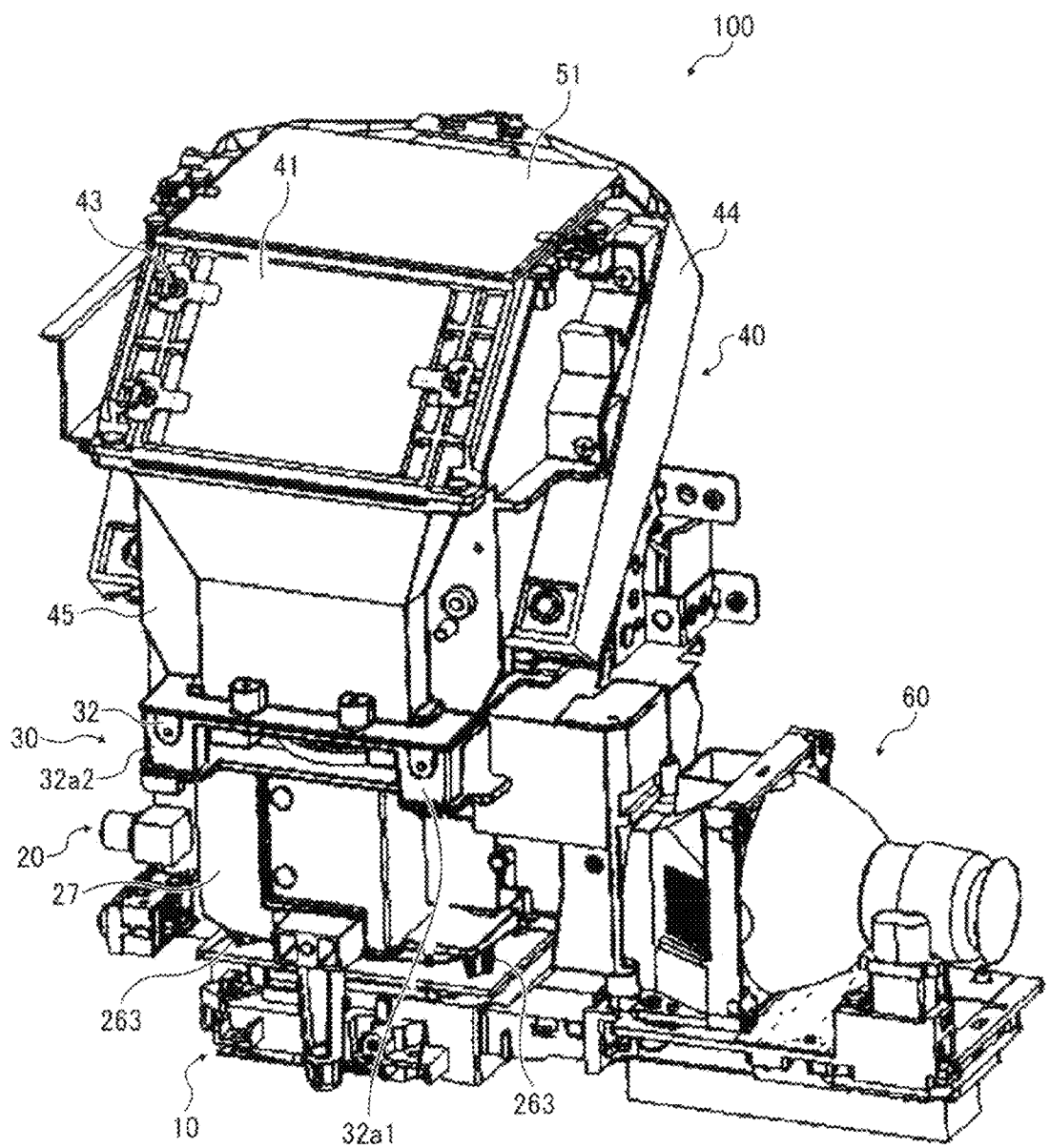
FIG. 4 is a perspective diagram illustrating an optical engine unit and a light source unit mounted inside of the projector.
Figure 4:
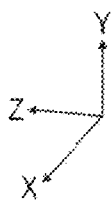

FIG. 4 is a perspective diagram illustrating an optical engine unit 100 and a light source unit 60 mounted inside of the projector 1.

As shown in FIG. 4, a light modulator 10, the lighting unit 20, the first optical system 30, and the second projection optical system 40 that comprise the optical engine unit 100 are placed alongside of the y direction in FIG. 4 among directions parallel to the projection surface and the field of the projection image. In addition, a light source unit 60 is mounted in the right side of the lighting unit 20 in FIG. 4. Symbols 32a1 and 32a2 in FIG. 4 indicate legs of a lens holder 32 in the first optical system 30, and symbol 263 indicates a screw part to screw the light modulator 10 onto the lighting unit 20.

Figure 5:
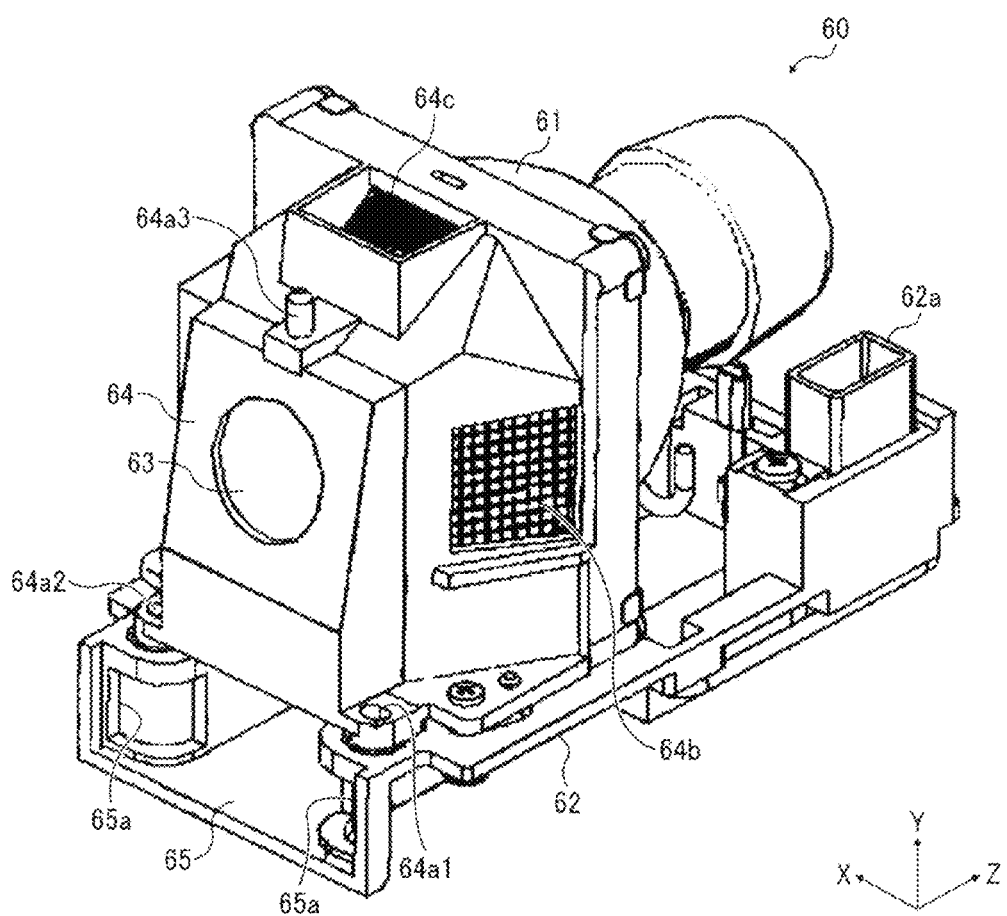
FIG. 5 is a schematic perspective diagram illustrating the light source unit.

FIG. 5 is a schematic perspective diagram illustrating the light source unit 60.

The light source unit 60 includes a light source bracket 62, and a light source 61 such as a halogen lamp, a metal halide lamp, and high-pressure mercury vapor lamp etc. is mounted on the upper part of the light source bracket 62. The light source bracket 62 includes a connector 62a to connect to a power connector connected to a power supply (not shown in figures). The connector 62a is placed on one end in the longitudinal direction (z direction) of the light source unit 60.

A holder 64 that holds a reflector (not shown in figures) etc. is screwed on the upper part of the light source bracket 62 and the light-emitting side of the light source 61. On the surface opposed to the light source 61 of the holder 64, an emitting window 63 is placed. After being emitted from the light source 61, the light is focused on the emitting window 63 by a reflector held by the holder 64 (not shown in figures) and is emitted from the emitting window 63.

Light source positioning parts 64a1, 64a2, and 64a3 to position the light source unit 60 on a lighting bracket 26 (shown in FIG. 6) in the lighting unit 20 are placed on both ends in the x direction, the upper surface of the holder 64 and the lower surface of the holder 64. The two light source positioning parts 64a1 and 64a2 placed on the lower surface of the holder 64 are formed as holes. By contrast, the light source positioning part 64a3 placed on the upper surface of the holder 64 is formed as a projection.

On the side surface of the holder 64, a light source intake duct 64b that intakes air to cool the light source 61 is placed. On the upper surface of the holder 64, a light source exhaust vent 64c that exhausts air heated by the light source 61 is placed.

On the light source bracket 62, a handle unit 68 to unmount the light source unit 60 by pinching by a user operation in replacing the light source unit 60 is placed. The handle unit 68 is mounted rotatably in the longitudinal direction (z direction in FIG. 5) of the light source bracket 62 in the almost center of the connector unit 62a and the light source positioning parts 64a1 and 64a2. The handle unit 68 can be an appropriate form pinchable by a user operation other than the form shown in figures.

Figure 6:
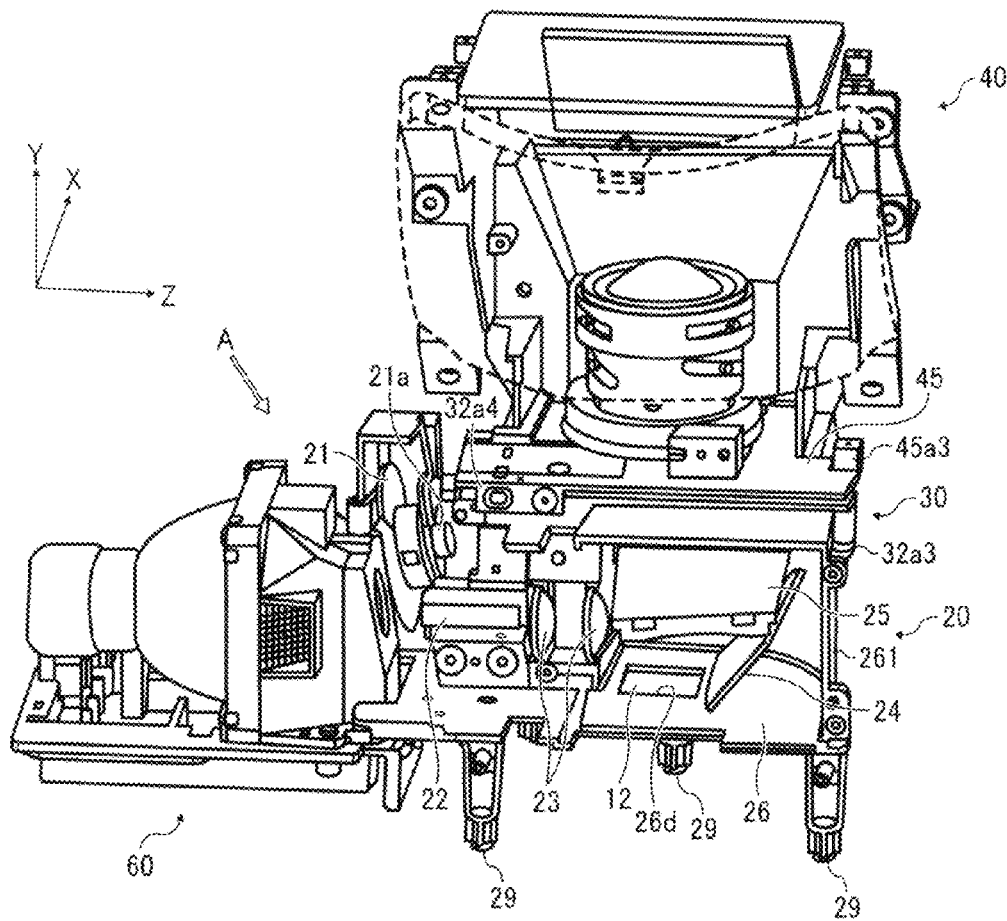
FIG. 6 is a perspective diagram illustrating optical devices included in the lighting unit along with other units.

FIG. 6 is a perspective diagram illustrating optical devices included in the lighting unit 20 along with other units.

The lighting unit 20 includes a color wheel 21, a light tunnel 22, two relay lenses 23, a cylinder mirror 24, and a concave mirror 25, and those units are held by a lighting bracket 26. The lighting bracket 26 includes a housing part 261 that contains the two relay lenses 23, the cylinder mirror 24, and the concave mirror 25. Among four side surfaces of the housing part 261, only the right surface in FIG. 6 includes a panel, and other three surfaces are open. An off light board 27 (shown in FIG. 7) is mounted on the side opening back in the x direction in FIG. 6. A cover unit (not shown in figures) is mounted on the side opening front in the x direction in FIG. 6. Consequently, the two relay lenses 23, the cylinder mirror 24, and the concave mirror 25 are covered by lighting bracket 26, the off light board 27 (shown in FIG. 6), and the cover unit (not shown in figures).

In addition, there is a through-hole 26d to expose the DMD 12 on the lower surface of the housing unit 261 in the lighting bracket 26.

The lighting bracket 26 includes three legs 29. These legs 29 contact a base unit 53 (shown in FIG. 11) in the projector 1 and support weight of the first optical system 30 and the second projection optical system 40 stacked on and fixed to the lighting bracket 26. In addition, space that outside air flows to the heat sink 13 (shown in FIG. 7) as a radiator to radiate heat of the DMD 12 in the light modulator 10 is formed by laying out the legs 29.

The symbols 32a3 and 32a4 shown in FIG. 6 indicate the leg parts of the lens holder 32 in the first optical system 30, and the symbol 45a3 shown in FIG. 5 indicates the screwed part 45a3 in the second projection optical system 40.

Figure 7:
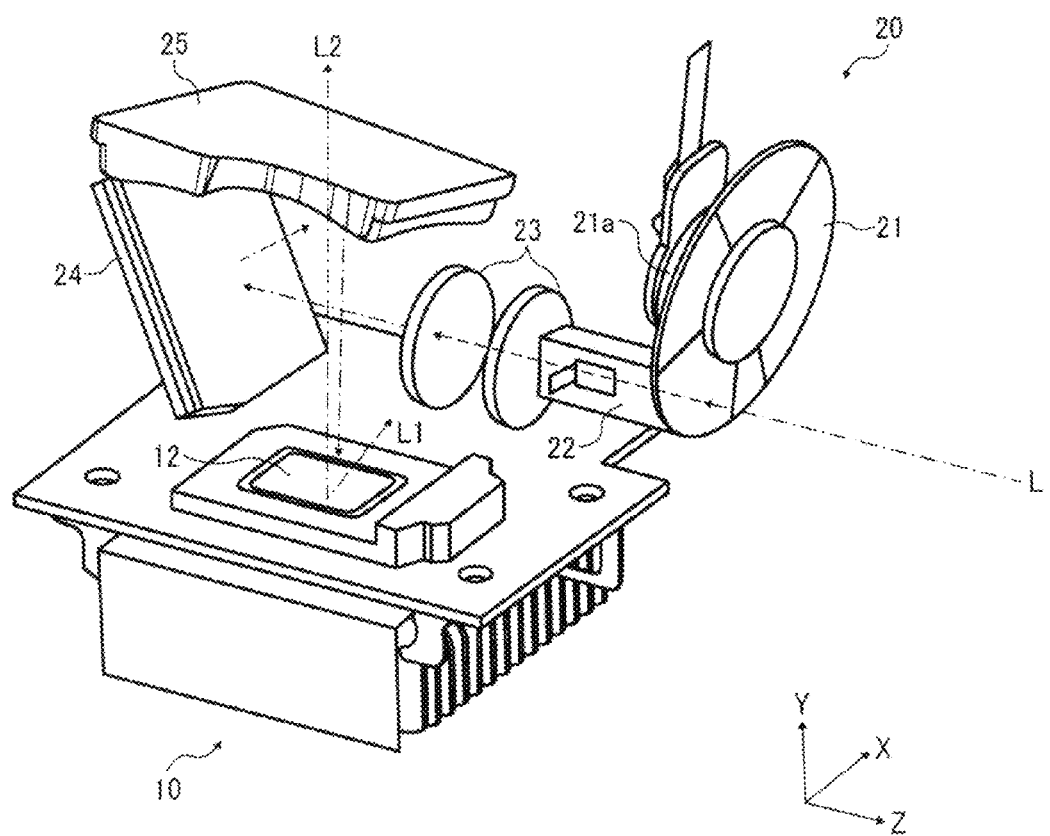
FIG. 7 is a diagram illustrating light path in the lighting unit.

FIG. 7 is a diagram illustrating light path L in the lighting unit 20.

The color wheel 21 is discoid and fixed to the motor axis of the color motor 21a. There are filters R (red), G (green), and B (blue) etc. in the rotating direction on the color wheel 21. Light focused by a reflector (not shown in figures) on the holder 64 of the light source unit 60 goes through the emitting window 63 and arrives at the peripheral area of the color wheel 21. After arriving at the peripheral part of the color wheel 21, the light is split into R light, G light and B light by the rotation of the color wheel 21 time-divisionally.

After being split by the color wheel 21, the light enters into the light tunnel 22. The inner surface of the square tube-shaped light tunnel 22 is mirror-finished. After entering into the light tunnel 22, the light is reflected multiple times on the inner surface of the light tunnel 22, the light becomes uniform surface light source, and the light is emitted toward the relay lenses 23.

After going through the light tunnel 22, the light goes through the two relay lenses 23, the light is reflected by the cylinder mirror 24 and the concave mirror 25, and the light focuses on the image generating surface of the DMD 12 to form an image.

Figure 8:
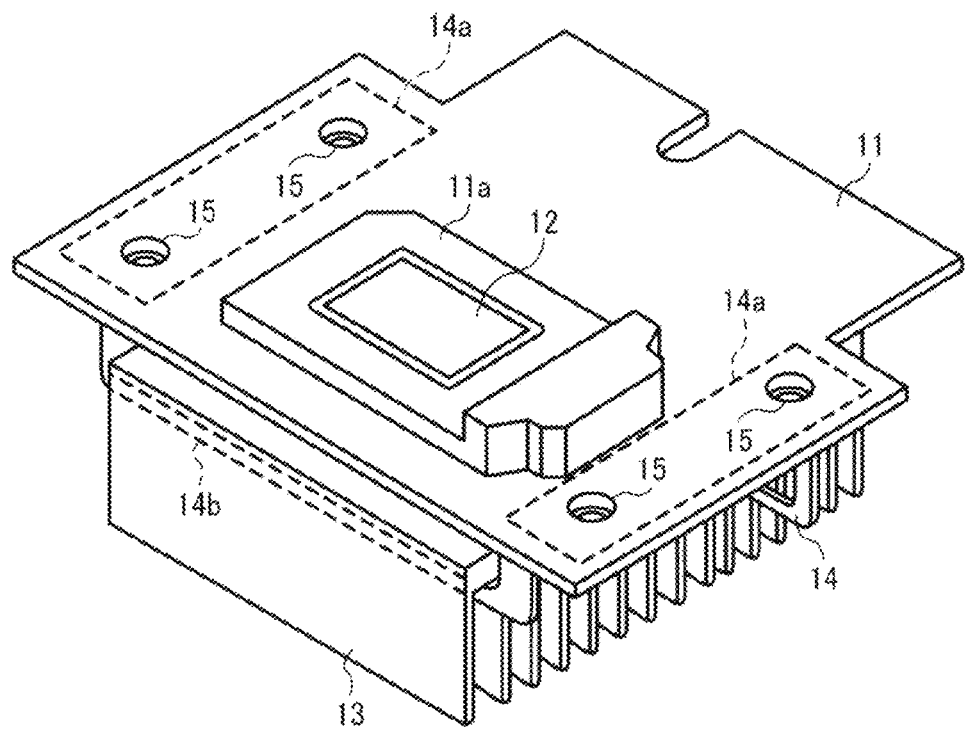
FIG. 8 is a perspective diagram illustrating the light modulator.

FIG. 8 is a perspective diagram illustrating the light modulator 10.

As shown in FIG. 8, the light modulator 10 includes the DMD board 11 that mounts the DMD 12. The DMD 12 is mounted on a socket 11a placed on the DMD board 11 facing the image generating surface where micro mirrors are placed in a reticular pattern upward. The DMD board 11 includes a driving circuit to drive the DMD mirrors and other circuits. On the backside of the DMD board 11 (the opposite side to the side where the socket 11a is placed), the heat sink 13 that radiates the heat of the DMD 12 as a radiator is fixed. On the DMD board 11, the part where the DMD 12 is mounted is through-holed, and the heat sink 13 includes a projecting part 13a that firs in to the through-hole (not shown in figures). The head of the projecting part 13a forms a flat surface. After inserting the projecting part 13a into the through-hole (not shown in figures), the flat surface at the head of the projecting part 13a contacts the backside of the DMD 12 (the opposite side to the image generating surface). It is possible to improve heat conductivity by mounting an elastic transformable heat transfer seat at the flat surface or the point on the backside of the DMD 12 where the heat sink 12 contacts and enhancing adhesiveness between the flat surface of the projecting part 13a and the backside of the DMD 12.

The heat sink 13 is pressed and fixed to the surface on the DMD board 11 opposite to the surface where the socket 11a is placed by a fixing component 14. The fixing component 14 includes a board-shaped fixing part 14a that opposes to the right part of the backside of the DMD board 11 in FIG. 8 and a board-shaped fixing part 14a that opposes to the left part of the backside of the DMD board 11 in FIG. 8. There is a pressing part 14b to interlink the left fixing part with the right fixing part around one end and the other end in the x direction of each of the fixing parts.

After screwing the light modulator 10 onto the lighting bracket 26 (shown in FIG. 6), the heat sink 13 is pressed and fixed to the surface opposite to the surface where the socket 11a is mounted on the DMD board 11 by the fixing component 14.

How the lighting bracket 26 in the light modulator 10 is fixed is described below. First, the DMD 12 positions the light modulator 10 on the lighting bracket 26 so that the light modulator 10 faces onto the opening duct of the emitting through-hole 26d placed on the lower surface of the lighting bracket 26 in the lighting unit 20 shown in FIG. 5. Subsequently, a screw is inserted from downside in FIG. 7 so that the screw goes through the through-hole placed on the fixing part 14a (not shown in figures) and the through-hole 15 on the DMD board 11. Subsequently, the screw is screwed into a screw hole placed on the lower part of the screwing part 263 (shown in FIG. 3) mounted on the lighting bracket 26 to fix the light modulator 10 on the lighting bracket 26. As the screw is screwed on the screwing part 263 mounted on the lighting bracket 26, the fixing part 14 pushes the heat sink 13 to the side of the DMD board. Consequently, the heat sink 13 is pressed and fixed to the surface opposite to the surface where the socket 11a is mounted on the DMD board 11.

As described above, the light modulator 10 is fixed to the lighting bracket 26, and the three legs 29 shown in FIG. 5 also supports the weight of the light modulator 10.

On the image generating surface of the DMD 12, the mobile multiple micro mirrors are placed in a reticular pattern. Each micro mirror can incline the mirror surface at a predetermined angle around the twisting axis to have two states, "on" and "off". If the micro mirror is in the "on" state, as the arrow L2 in FIG. 7 indicates, the micro mirror reflects the light from the light source 61 into the first optical system 70 (shown in FIG. 2). If the micro mirror is in the "off" state, as the arrow L1 in FIG. 7 indicates, the micro mirror reflects the light from the light source 61 into the off light board 27 held at the side of the lighting bracket 26 shown in FIG. 6. Consequently, by driving each mirror individually, it is possible to control projecting the light for each pixel of the image data and to generate the image.

The light reflected to the off light board 27 (not shown in figures) is absorbed as heat, and it is cooled by outside airflow.

Figure 9:
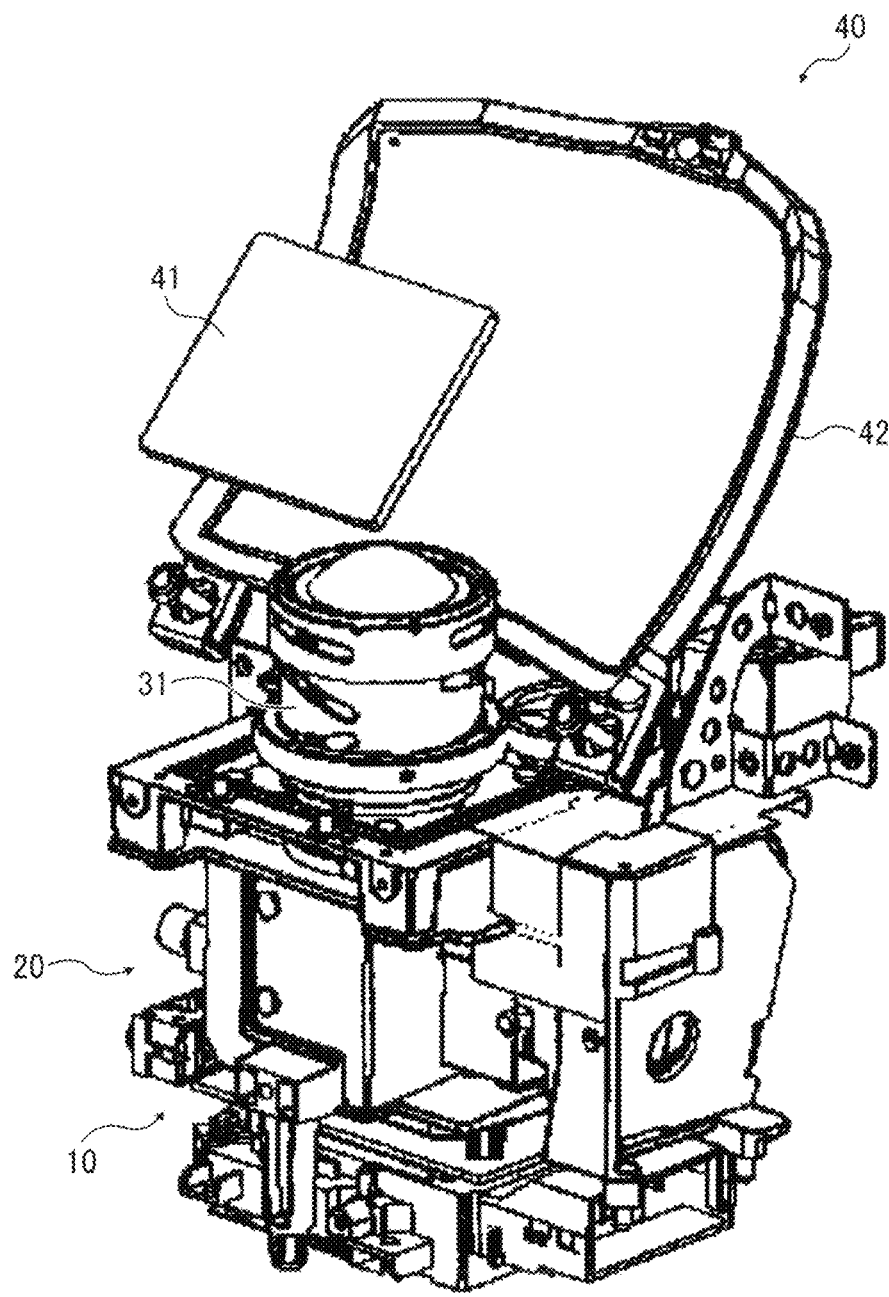
FIG. 9 is a perspective diagram illustrating the second optical system included in the second projection optical system along with the projection lens unit, the lighting unit, and the light modulator.

FIG. 9 is a perspective diagram illustrating the second optical system included in the second projection optical system 40 along with the projection lens unit 31, the lighting unit 20, and the light modulator 10. As shown in FIG. 9, the second projection optical unit 40 includes a reflecting mirror 41 and a concave curved mirror 42 that comprises the second optical system. The reflecting surface of the curved mirror 42 can be formed as spherical surface, rotation symmetric aspheric surface, and sculptured surface.

Figure 10:
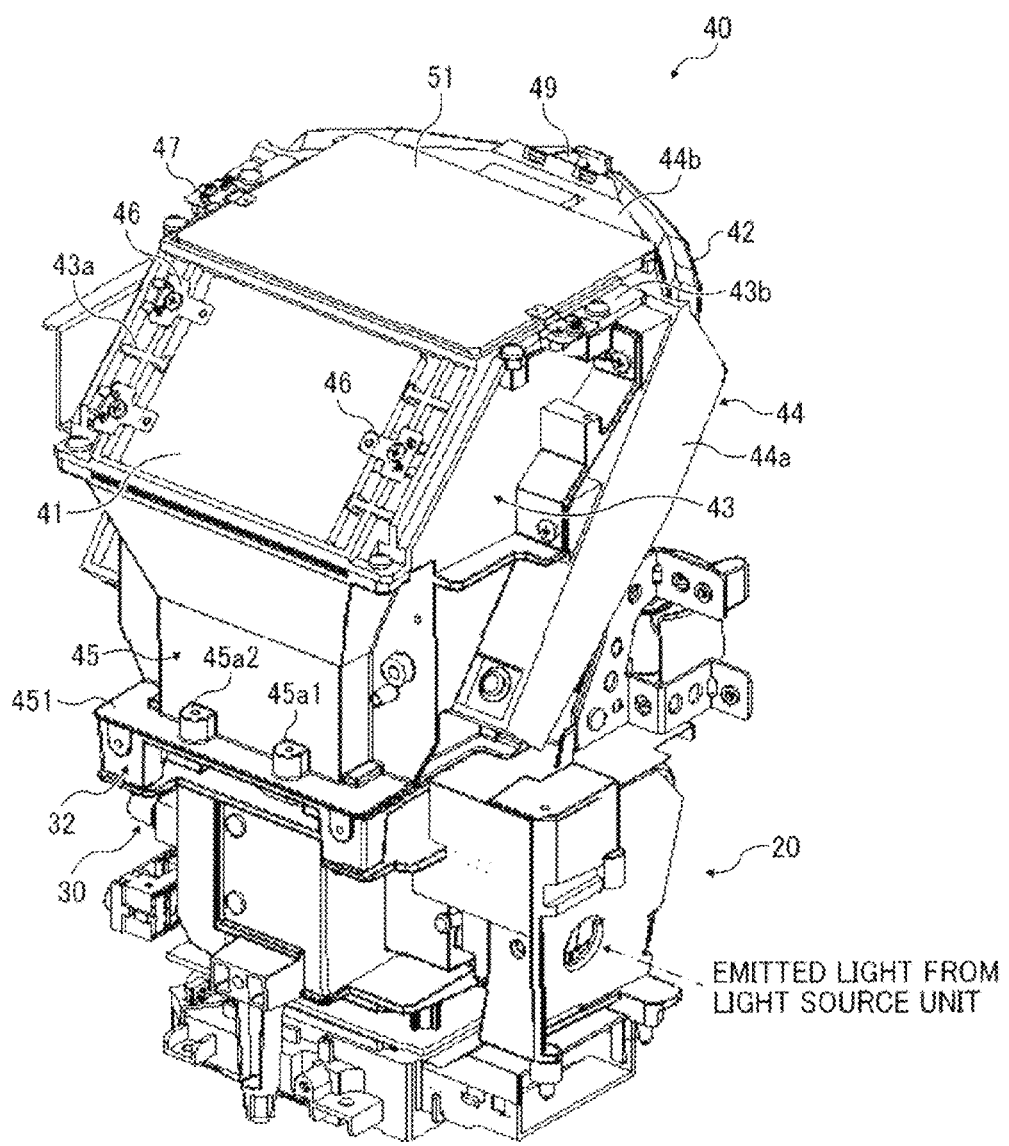
FIG. 10 is a perspective diagram illustrating the second projection optical system along with the first projection optical system, the lighting unit, and the light modulator.

FIG. 10 is a perspective diagram illustrating the second projection optical system 40 along with the first projection optical system 30, the lighting unit 20, and the light modulator 10. As shown in FIG. 10, the second projection optical system 40 includes the dustproof glass window 51 to transmit the image reflected by the curved mirror 42 and protect the optical devices in the projector from dust.

The second projection optical unit 40 includes a mirror bracket 43 that holds the reflecting mirror 41 and the dustproof glass window 51. In addition, the second projection optical system 40 includes a free mirror bracket 44 that holds the curved mirror 42 and a mirror mount 45 that holds the mirror bracket 43 and the free mirror bracket 44.

The mirror mount 45 is boxed-shape. The top surface, the bottom surface, and the backside in the x direction of the mirror mount 45 are opened in FIG. 10. The mirror mount 45 looks U-shaped from up. Edge parts extending in the x direction at each of front side and backside in the z direction of the upper opening of the mirror mount 45 consist of a gradient part and a flat part. The gradient part rises as going from the front edge in the x direction to the back edge in the x direction in FIG. 10. The flat part is parallel to the x direction in FIG. 10. The gradient part is placed at the front side in the x direction in FIG. 10 compared to the parallel part. The edge part at the front side in the x direction of the upper opening of the mirror mount 45 extending to the z direction is parallel to the z direction in FIG. 10.

The mirror bracket 43 is mounted on the upper part of the mirror mount 45. The reflecting mirror 41 is held so that the reflecting mirror 41 blocks the opening duct on the inclined surface of the mirror bracket 43, and the dustproof glass window 51 is held so that the dustproof glass window 51 blocks the upper opening duct of the mirror bracket 43. The free mirror bracket 44 that holds the curved mirror 42 is mounted on the mirror mount 45. The second projection optical system 40 is fixed and mounted on the lens holder 32 in the first optical system 30. Consequently, the projection lens unit 31 is surrounded by the reflecting mirror 41, the curved mirror 42, the mirror bracket 43, the free mirror bracket 44, the mirror mount 45, and the dustproof glass window 51.

The reflecting mirror 41 is positioned and held on the gradient surface 43a of the mirror bracket 43 by pressing its both ends in the z direction to the gradient surface 43a of the mirror bracket 43 by a leaf spring-shaped mirror holding part 46. One end of the reflecting mirror 41 in the z direction is fixed by the two mirror holding parts 46, and the other end of the reflecting mirror 41 is fixed by the one mirror holding part 46.

The dustproof glass window 51 is positioned and held on the mirror bracket 43 by pressing its both ends in the z direction to the flat surface 43b of the mirror bracket 43 by a leaf spring-shaped glass holding part 47. The dustproof glass window 51 is held by the one glass holding part 47 at each of the both ends in the z direction.

The free mirror bracket 44 that holds the curved mirror 42 includes slanted arm parts 44a descending from the backside to the front side in the x direction in FIG. 10 at the front side and the backside in the z direction. The free mirror bracket 44 includes an interlinking part 44b that interlinks these two arm parts 44a at the upper part of the arm part 44a. The arm part 44a of the free mirror bracket 44 is mounted on the mirror mount 45 so that the curved mirror 42 covers the opening of the mirror mount 45 on the backside in the x direction in FIG. 10.

At the top edge of the curved mirror 42, almost center part of the edge part at the side of the dustproof glass window 51 is held to the interlinking part 44b of the free mirror bracket 44 by a leaf spring-shaped free mirror holding part 49. The both ends on the side of the first optical system in the z direction in FIG. 10 are screwed on the arm part 44a of the free mirror bracket 44.

The second projection optical system 40 is mounted and fixed on the lens holder 32 of the first projection optical system. More specifically, there is a lower surface 451 on the lower part of the mirror mount 45 opposed to an upper surface of the lens holder 32. On the lower surface 451, four tube-shaped screwed parts 45a1, 45a2, and 45a3 to screw on the first projection optical system 30 are formed. (The screwed part 45a1 and 45a2 are shown in FIG. 10. The screwed part 45a3 is shown in FIG. 6. Other screwed parts are not shown in figures.) The second projection optical system 40 is screwed on the first projection optical system 30 by running the screw 48 through the screw through-holes placed on the lens holder 32 in the first projection optical system 30 and screwing the screws 48 in the screwed parts 45a1, 45a2, and 45a3.

When the second projection optical system 40 is mounted on the lens holder 32 in the first projection optical system 30, as shown in FIG. 7, the upper part of the projection lens unit 31 above the lens holder 32 is contained in the mirror mount 45 in the second projection optical system 40. In addition, when the second projection optical system 40 is mounted on the lens holder 32 in the first projection optical system 30, there is a gap between the curved mirror 42 and the lens holder 32, and the idler gear 35 (shown in FIG. 7) enters in that gap.

Figure 11:
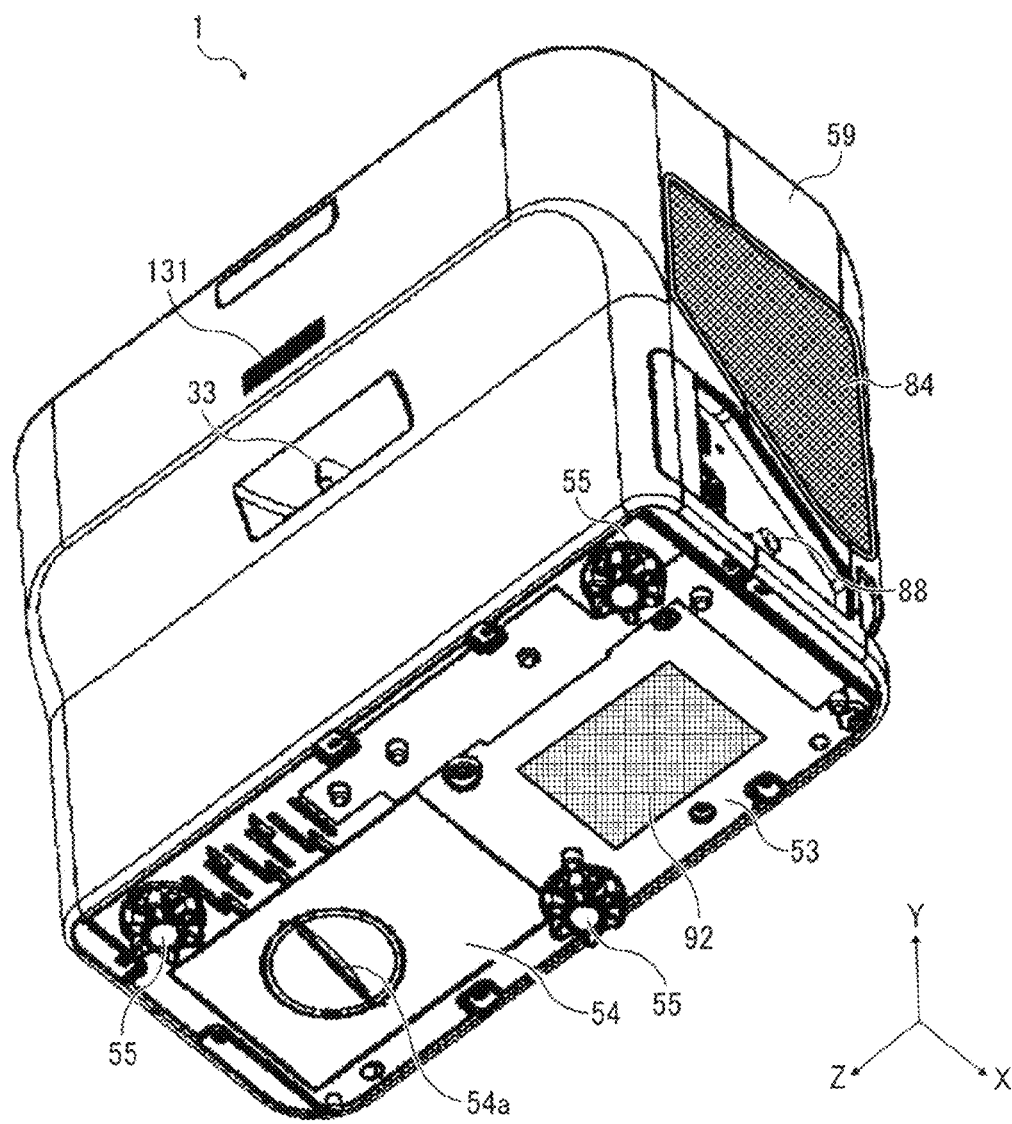
FIG. 11 is a perspective diagram illustrating the projector viewed from a supported surface.

FIG. 11 is a perspective diagram illustrating the projector 1 viewed from a supported surface.

As shown in FIG. 11, there is an opening cover 54 on a base part 53 that comprises the bottom surface of the projector 1, and there is a rotation operating part 54a on the opening cover 54. In case of rotating the rotation operating part 54a, the opening cover 54 is released from the main body of the projector 1, and the opening cover 54 become removable from the main body of the projector 1. There is a first intake duct 92 on the base part 53 opposite to the DMD 12.

As shown in FIG. 11, on y-x plane on one end of the exterior cover 59 of the projector 1, there is a first intake duct 84 and an auxiliary input port 88 that accepts image data input from an external apparatus such as a PC. On y-z plane on the other end of the exterior cover 59 of the projector 1 (where the focus lever 33 is exposed), there is a second intake duct 131. There are multiple openings in the second intake duct 131, and the total cross-section area of these multiple openings is configured to be more than 300 mm$^2$.

Figure 12:
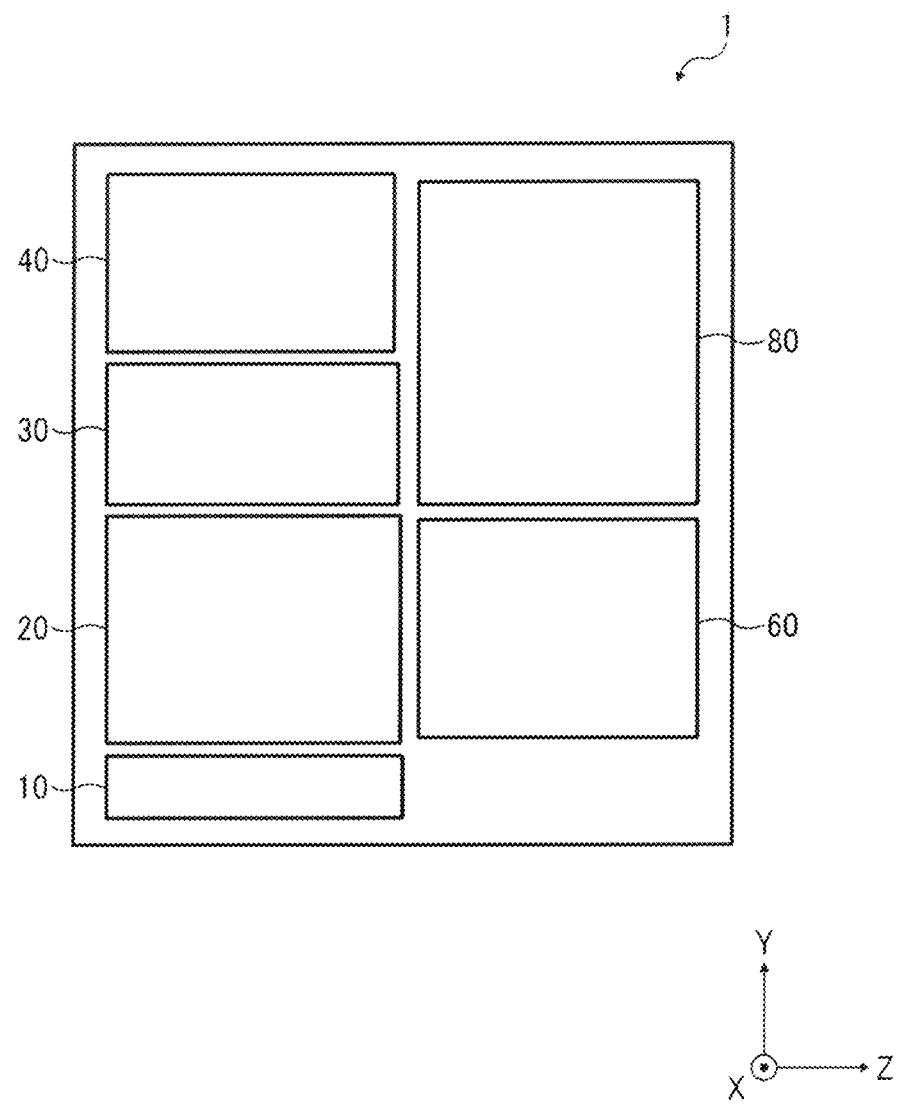
FIG. 12 is a diagram illustrating layout relationship among units in the apparatus.

FIG. 12 is a diagram illustrating layout relationship among units in the apparatus. As shown in FIG. 12, the light modulator 10, the lighting unit 20, the first projection optical system 30, and the second projection optical system 40 are provided stacked in the y direction as the minor axis on the projection surface, and the light source unit 60 is provided in the z direction as the major axis on the projection surface against the stacked body stacking the light modulator 10, the lighting unit 20, the first projection optical system 30, and the second projection optical system 40. More specifically, the lighting source unit 60 is connected to the image forming unit 101 in the direction perpendicular to the direction in which the image forming unit 101 comprised of the light modulator 10 and the lighting unit 20 and the projection optical unit 102 comprised of the first projection optical system 30 and the second projection optical system 40 are stacked. In addition, the image forming unit 101 and the light source unit 60 are provided on the same line parallel to the base part 53. The image forming unit 101 and the projection optical unit 102 are provided on the same line perpendicular to the base part 53 in order of the image forming unit 101 and the projection optical unit 102 from the base part 53. As a result, it is possible to prevent foot print of the apparatus from expanding to the direction perpendicular to the surface of the projection image projected on the projection surface 2. Consequently, in case of using the projector mounted on a desk etc., it is possible to prevent the apparatus from interfering with layout of the desk and chairs even in a small meeting room.

Figure 13:
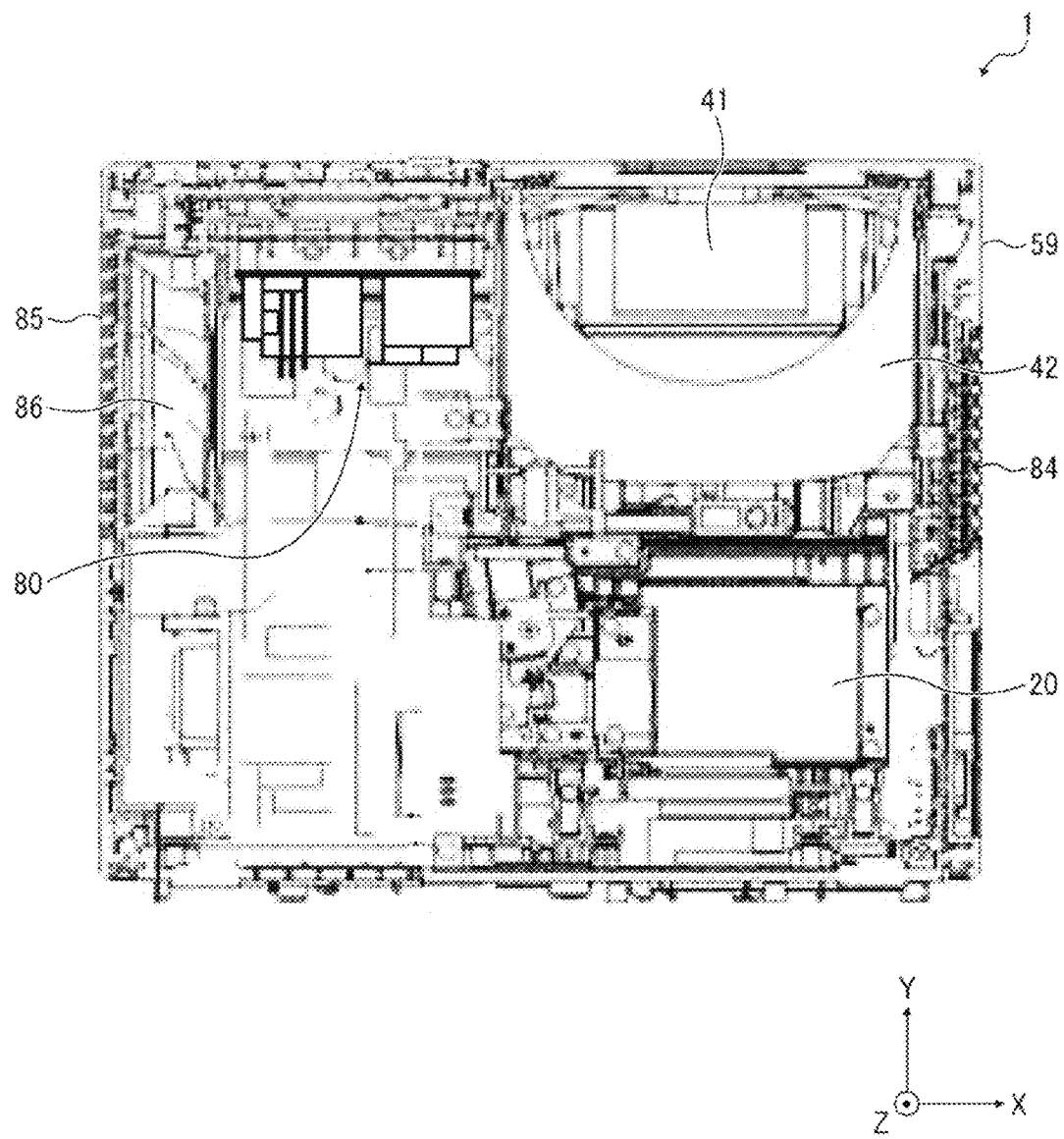
FIG. 13 is a perspective diagram illustrating the light modulator, the lighting unit, and an intake blower.

FIG. 13 is a cross-sectional diagram illustrating the projector cut in the direction perpendicular to the x direction.

As shown in FIG. 13, there is an exhaust vent 85 on the y-x plain opposite to the y-x plain on which the first intake duct 84 is provided on the exterior cover 59. An exhaust fan 86 is provided opposed to the exhaust vent 85. The power supply 80 is provided above the lighting unit 20 and adjacent to the exhaust fan 86.

Figure 14A:
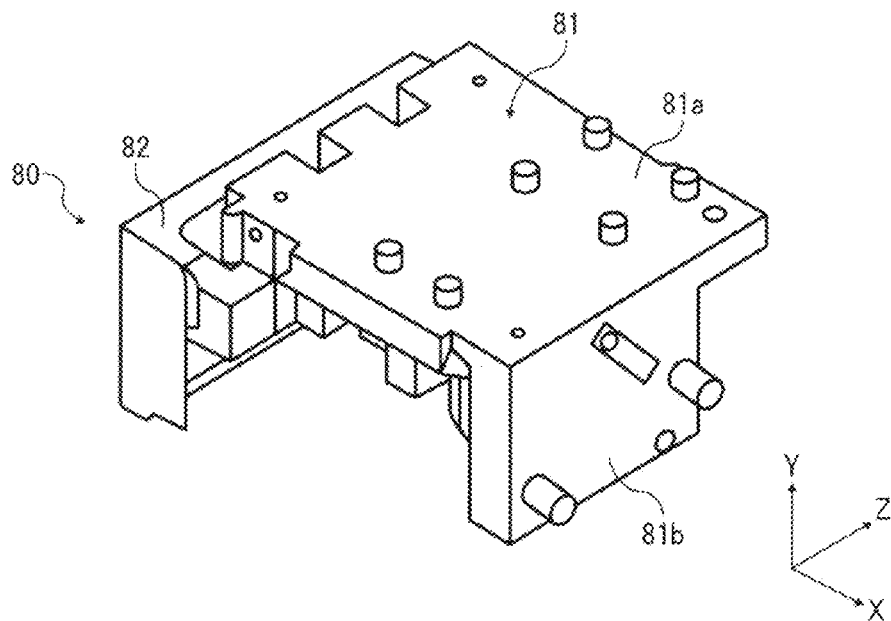
FIGS. 14A and 14B are diagrams illustrating a power supply.
Figure 14B:
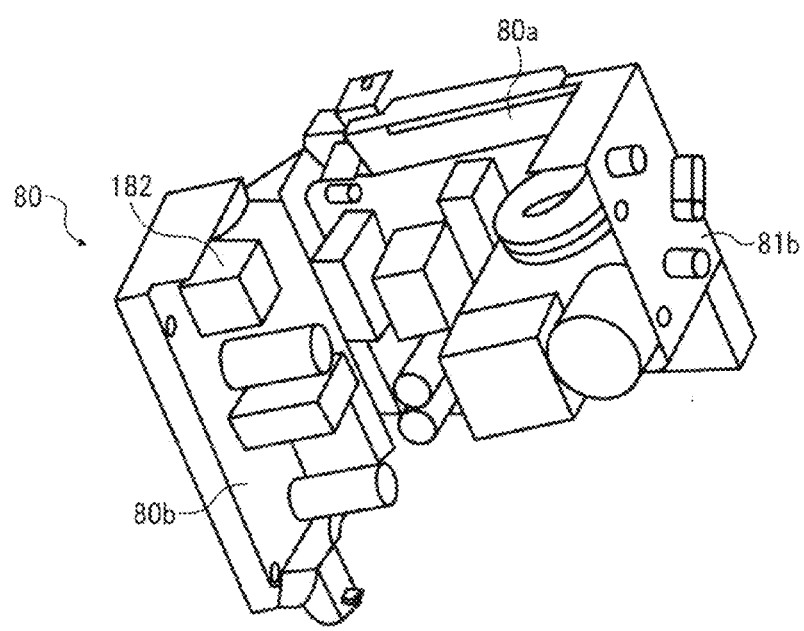
Figure 15:
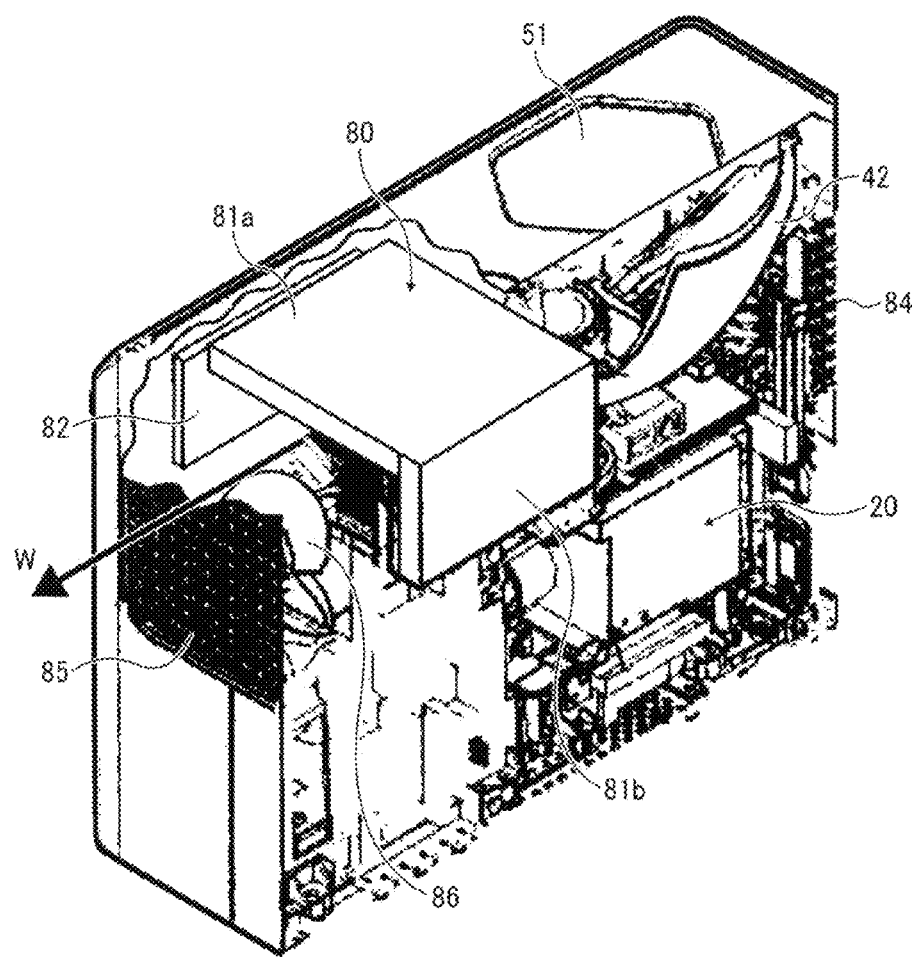
FIG. 15 is a perspective diagram illustrating how the power supply is mounted in the apparatus.

FIGS. 14A and 14B are diagrams illustrating the power supply 80.

The power supply 80 includes a PFC power supply board to supply power to a power stabilization unit that supplies stable power (electric current and voltage) to a controller (not shown in figures) that controls the DMD 12 etc. and the light source 61. The PFC power supply board is divided into a main PFC power supply board 80a as a first power supply board and a sub-PFC power supply board 80b as a second power supply board. The main PFC power supply board 80a is mounted on a main board holder 81, and the sub-PFC power supply board 80b is mounted on a sub-board holder 82.

The main board holder 81 includes a board mounting surface 81a on which the main PFC power supply board 80a is mounted and a cover surface 81b that extends to downward from the front end of the board mounting surface 81a in x direction in FIGS. 14A and 14B on its lower surface.

The sub-board holder 82 is mounted on the back end of the board mounting surface 81a in x direction in FIGS. 14A and 14B so that the sub-PFC power supply board 80b is opposed to the cover surface 81b. In addition, the sub-PFC power supply board 80b includes a thermal switch. As shown in FIG.

15, the power supply 80 is mounted on the main body of the apparatus so that the board mounting surface 81a and the cover surface 81b of the main board holder 81 and the sub-board holder 82 enclose the intake duct of the exhaust fan 86.

Figure 16:
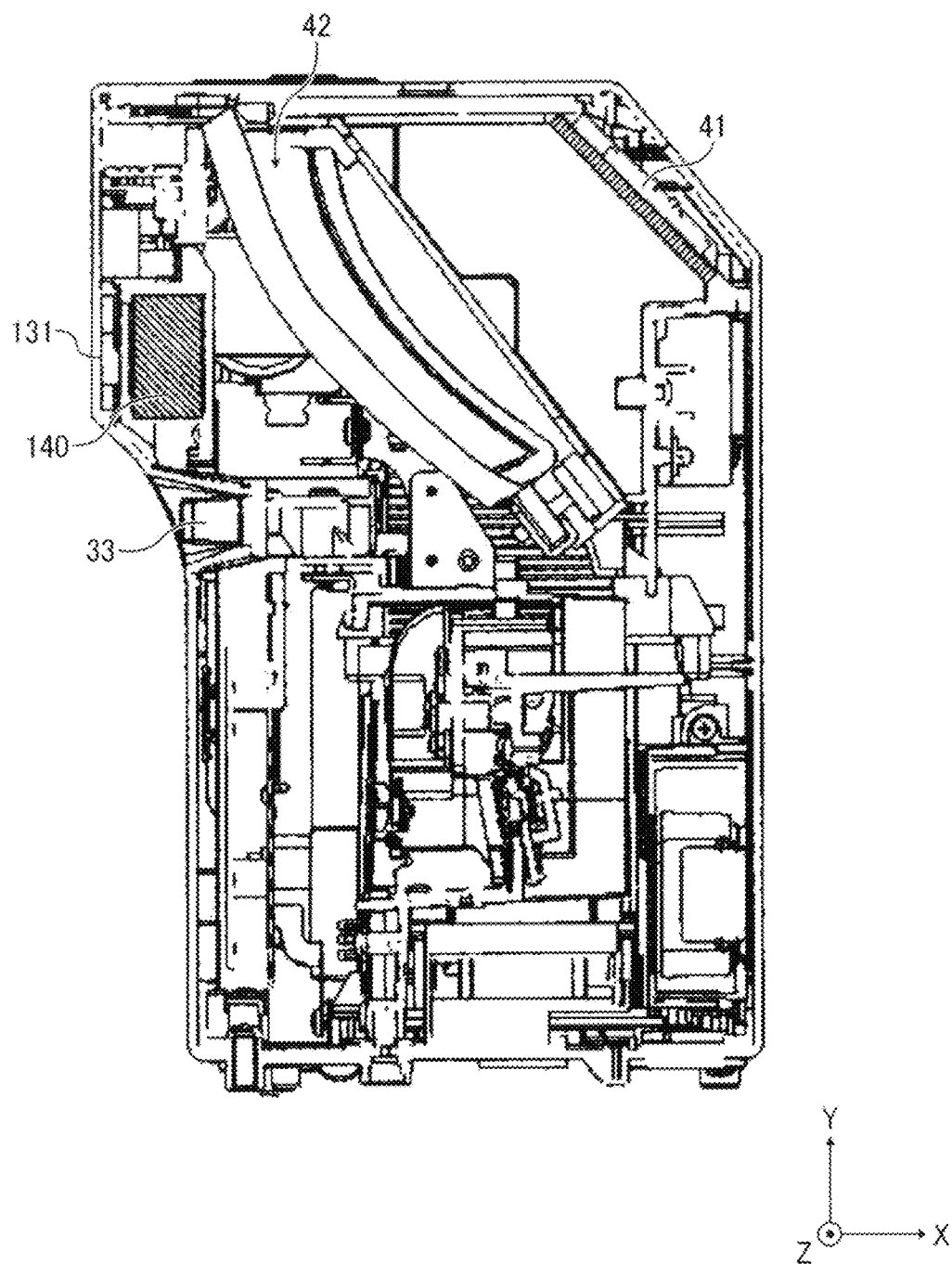
FIG. 16 is a cross-sectional diagram illustrating the projector cut in the direction perpendicular to the z direction.

FIG. 16 is a cross-sectional diagram illustrating the projector cut in the direction perpendicular to the z direction.

As shown in FIG. 16, a speaker 140 is provided opposed to the second intake duct 131, and the sound of the speaker 140 is output to outside from the opening of the second intake duct 131. The length of the second intake duct 131 in the z direction is longer enough than the length of the speaker 140 in the z direction. As described above, by using the second intake duct 131 as the sound output opening of the speaker 140, it is possible to reduce openings provided on the exterior cover 59 compared to the configuration in which the sound output opening of the speaker 140 is provided separately from the second intake duct 131. Consequently, it is possible to prevent design of the projector 1 from deteriorating.

As shown in FIG. 16, the second intake duct 131 is provided opposed around the center of the backside of the curved mirror 42 in the y direction.

Figure 17:
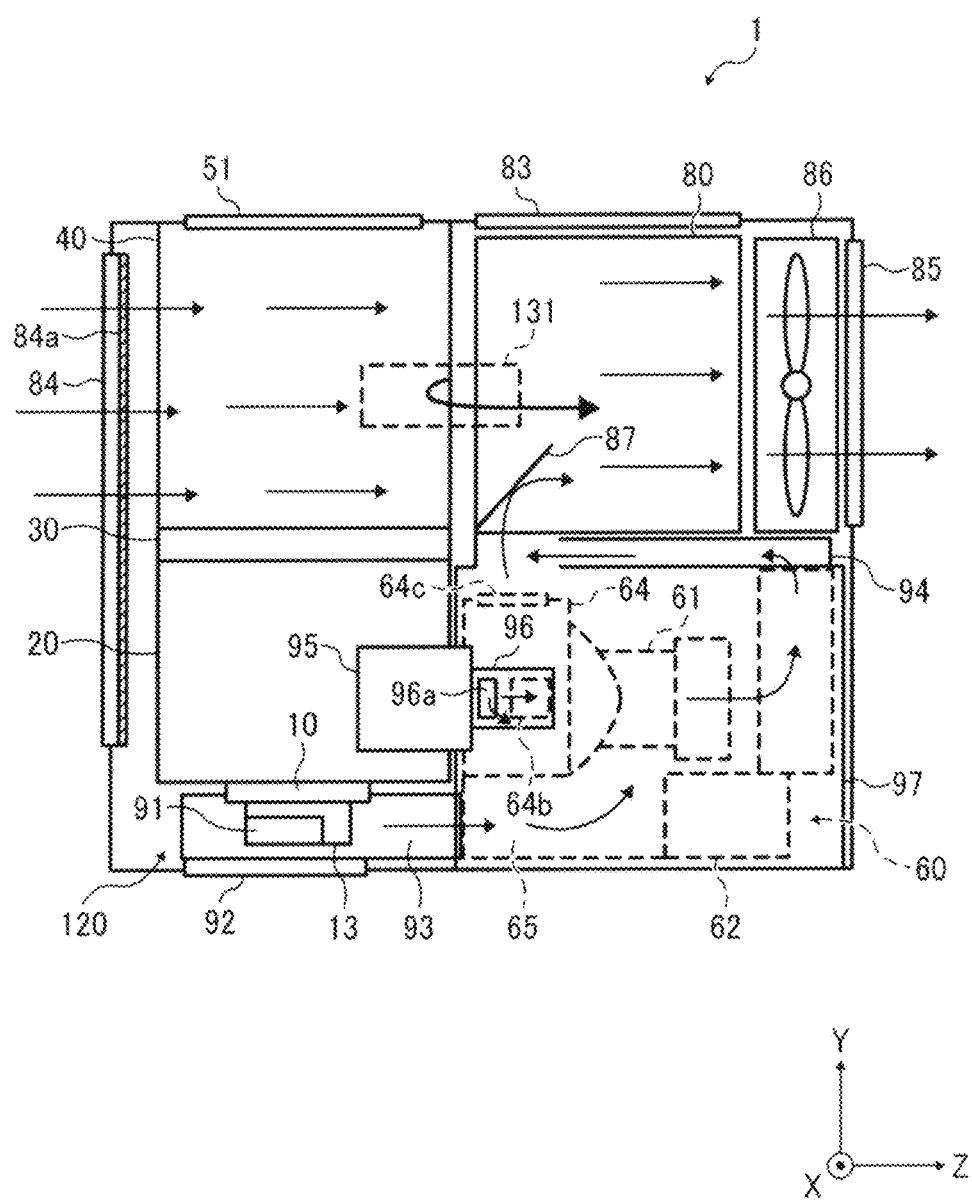
FIG. 17 is a diagram illustrating airflow in the projector 1

FIG. 17 is a diagram illustrating airflow in the projector 1 in this embodiment. FIG. 17 illustrates the projector 1 viewed from a direction perpendicular to the projection surface 2 (x direction).

As shown in FIG. 17, an opening first intake duct 84 to take outside air in the projector 1 is placed on one side surface of the projector 1 (left side in FIG. 17). The first intake duct 84 includes a rustproof filter 84a. An opening exhaust vent 85 to exhaust inside air of the projector 1 is placed on the other side surface of the projector 1 (right side in FIG. 17). An exhaust fan 86 is placed opposite to the exhaust vent 85. As shown in FIG. 16, the second intake duct 131 is placed on the side surface of the exterior cover 59 opposed to the curved mirror 42.

In case of viewing the projector 1 viewed from the direction perpendicular to the projection surface 2 (x direction), the exhaust vent 85, a part of the first intake duct 84, and the second intake duct 131 are placed so that they are located between the light source unit 60 and the control panel 83. The outside air taken in from the first intake duct 84 flows on the z-y plain of the mirror mount 45 in the second projection optical system 40 and the backside of the curved mirror 42 and moves toward the exhaust vent 85 alongside the mirror mount 45 and the backside of the curved mirror 42. As shown in FIGS. 14A and 14B, the power supply 80 placed above the light source unit 60 is arch-shaped from viewpoint of the z direction in FIG. 17. The air moves toward the exhaust vent 85 circulating alongside of the mirror mount 45 and the backside of the curved mirror 42 flows into the space surrounded by the power supply 80, and the air is exhausted through the exhaust vent 85.

Figure 18:
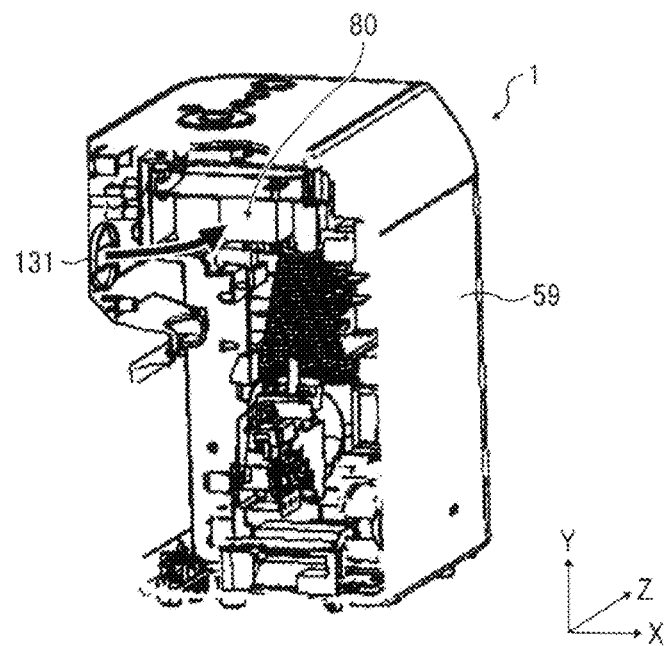
FIG. 18 is a perspective diagram illustrating airflow of outside air taken in through the second intake duct.

As shown in FIG. 18, the outside air drawn in through the second intake duct 131 also flows into the space surrounded by the arch-shaped power supply 80 opening the side of the light source unit 60, and the outside air drawn in through the second intake duct 131 is exhausted through the exhaust vent 85.

By laying the exhaust vent 85, the first intake duct 84, and the second intake duct 131 between the light source unit 60 and the control panel 83 in case of viewing the projector 1 viewed from the direction perpendicular to the projection surface 2, it is possible to generate airstream that goes between the light source unit 60 and the control panel 83 and is exhausted through the exhaust vent 85.

A light source blower 95 is placed around the light source unit 60. The air taken in by the light source blower 95 flows through the light source duct 96 and flows into a light source intake duct 64b (shown in FIG. 4) of the holder 64. Part of air that flows into the light source duct 96 flows between the light source housing 97 and the exterior cover 59 through an opening 96a formed on the light source duct 96 opposed to the exterior cover 59 (shown in FIG. 11).

The air that flows in between the light source housing 97 and the exterior cover 59 through the opening 96a of the light source duct 96 cools the light source housing 97 and the exterior cover 59, and the air is exhausted through the exhaust vent 85 by the exhaust fan 86.

The air that flows to the light source intake duct 64b flows in the light source 61, cools the light source 61, exhausted through the light source exhaust vent 64c placed on the upper surface of the holder 64. After being exhausted through the light source exhaust vent 64c, the air is exhausted to the space surrounded by the power supply 80 through the opening on the upper surface of the light source housing 97. Subsequently, after being mixed with low-temperature air flows into the space surrounded by the power supply 80 through the first intake duct and the second intake duct, the air is exhausted through the exhaust vent 85 by the exhaust fan 86. As described above, by exhausting the high-temperature air exhausted through the light source exhaust vent 64c after mixing with the outside air, it is possible to prevent the air exhausted through the exhaust vent 85 from being high-temperature.

It is favorable that the control panel 83 is placed on the upper surface of the apparatus for ease of use. However, in this embodiment, the dustproof glass window 51 to project images on the projection surface 2 is placed on the upper surface of the projector 1, and it is necessary to lay out the control panel 83 on the position overlapping with the light source 61 in case of viewing the projector 1 from the y direction.

In this embodiment, since the high-temperature air that cools the light source 61 is exhausted toward the exhaust vent 85 by using the airstream that flows from the first intake duct 84 and the second intake duct 131 toward the exhaust vent 85 through between the light source unit 60 and the control panel 83, it is possible to prevent the high-temperature air from moving toward the control panel 83. Consequently, it is possible to prevent the control panel 83 from being high-temperature by the high-temperature air after cooling the light source 61. In addition, part of air that flows from the first intake duct 84 and the second intake duct 131 toward the exhaust vent 85 circumventing the second projection optical system 40 goes just beneath the control panel 83 and cools the control panel 83. That also prevents the control panel 83 from being hot.

Figure 19:
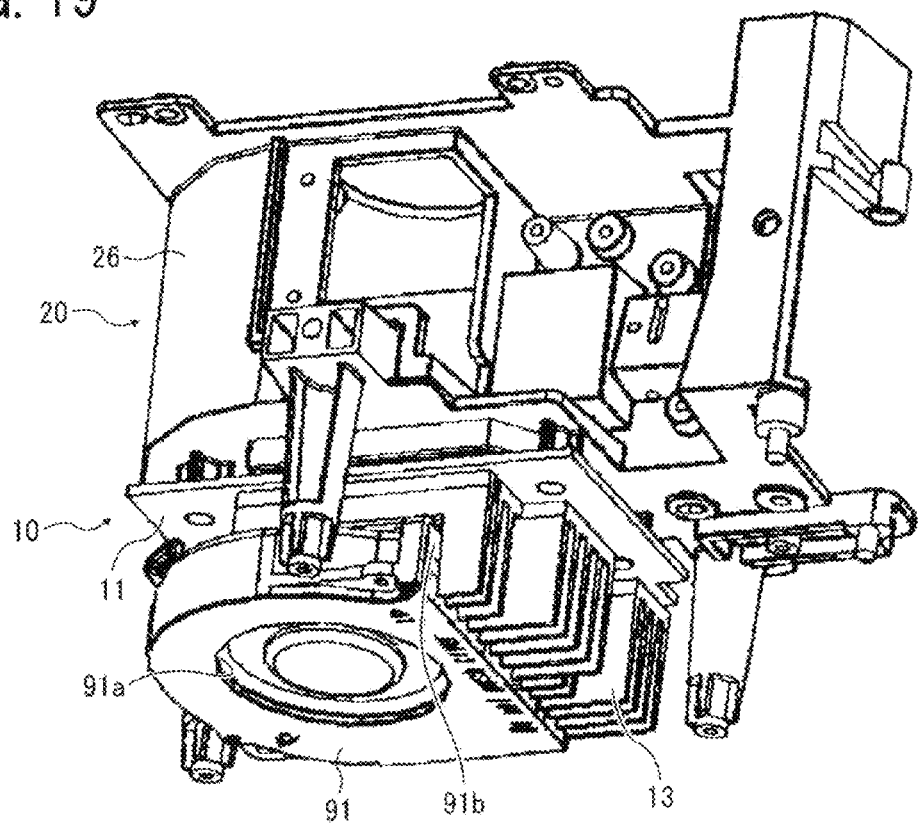
FIG. 19 is a perspective diagram illustrating a light modulator, a lighting unit, and an intake blower.

A cooling unit 120 that cools the heat sink 13 of the light modulator 10 and the light source bracket 62 of the light source unit 60 etc. is placed in the lower left side of the main body of the apparatus in FIG. 19. The cooling unit 120 includes an intake blower 91 and a horizontal duct 93.

As shown in FIG. 19, the intake blower 91 is a double-sided intake sirocco fan. The intake blower 91 is mounted on the light modulator 10 so that the blower intake duct 91a on the base part side of the intake blower 91 is opposed to the first intake duct 92 located on the base part 53 opposed to the DMD 12 on the case of the projector. The opposite side of the blower intake duct 91a on the base part side of the intake blower 91 is also the intake duct. However, air-intake of the blower intake duct 91a on the base part side is larger. The heat sink 13 consists of a first fin part whose height of the fin is predetermined and a second fin part whose height of the fin is taller than the first fin part. The intake blower 91 is mounted on the first fin part so that the blower exhaust vent 91*b* of the intake blower 91 is opposed to the second fin part of the heat sink 13. By adopting the double-sided intake sirocco fan for the intake blower 91, it is possible to cool the first fin part of the heat sink 13 effectively.

As shown in FIG. 17, the horizontal duct 93 is opened a part of its upper surface and the lower surface. The horizontal duct 93 is mounted on the base part 53 in the projector 1 so that the opening duct of the lower surface of the horizontal duct 93 is opposed to the first intake duct 92 placed on the base part 53. In addition, the light modulator 10 is mounted on the horizontal duct 93 so that the heat sink 13 in the light modulator 10 and the intake blower 91 mounted on the light modulator 10 go through the opening duct on the lower surface of the horizontal duct 93.

The intake blower 91 takes the outside air in through the blower intake duct 91*a* on the base part side via the first intake duct 92. The intake blower 91 exhausts the outside air that the intake blower 91 takes in to the second fin part of the heat sink through the blower exhaust vent 91*b*. Consequently, the second fin part of the heat sink 13 is air-cooled. By air-cooling the second fin part of the heat sink 13, it is possible to cool the DMD 12 effectively and prevent the DMD 12 from being high-temperature.

As shown in FIG. 17, the airstream is generated by the intake blower 91, after going through the heat sink 13, the air moves through the horizontal duct 93 and flows into the through part 65 or the opening duct 65*a* located on the light source bracket 62 in the light source unit 60 shown in FIG. 5. After circulating into the opening duct 65*a*, the air circulates between the movable cover 54 and the light source bracket 62 and cools the movable cover 54.

By contrast, after circulating into the through part 65, the air cools the light source bracket 62. Subsequently, the air flows into the part opposed to the emitting side of the light source 61 and cools the reflector of the light source 61 by cooling the opposite side of the reflecting surface of the reflector in the light source 61. Consequently, the air that goes through the through part 65 draws heat from both the light source bracket 62 and the light source 61. After going through near the reflector, the air goes through the exhaust duct 94 that directs the air from the height of the light source bracket 62 to the height of the lower part around the exhaust fan 86 mixed with the air exhausted from the light source exhaust vent 64*c*, and exhausted through the exhaust vent 85 by the exhaust fan 86. After cooling the movable cover 54, the air that circulates between the movable cover 54 and the light source bracket 62 through the opening duct 65*a* moves through inside the apparatus, and the air is exhausted through the exhaust vent 85 by the exhaust fan 86. Consequently, the airflow path from the first intake duct 92 to the exhaust vent 85 does not include around the gap between the lower part of the curved mirror 42 and the lens holder 32.

Figure 20A:
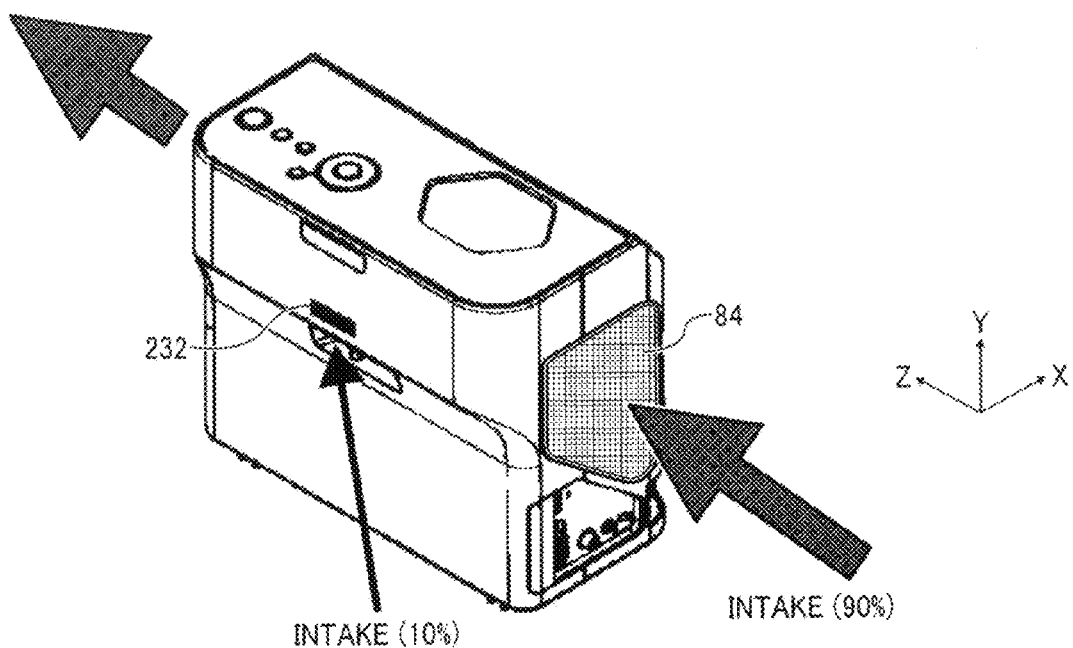
FIGS. 20A and 20B are perspective diagrams illustrating breathing outside air in conventional projectors
Figure 20B:
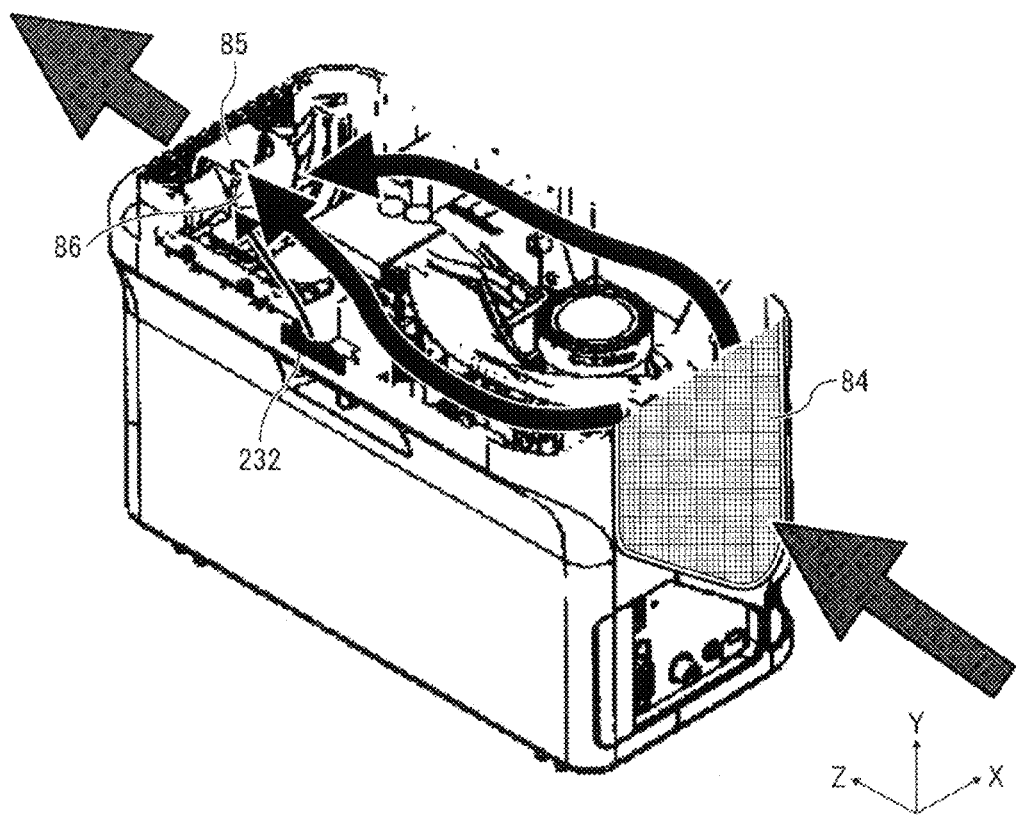

FIG. 20A is a perspective diagram illustrating breathing outside air in conventional projectors, and FIG. 20B is a cross-sectional diagram illustrating breathing outside air in conventional projectors cut in the direction perpendicular to the y direction.

As shown in FIGS. 20A and 20B, in the conventional projectors, an output opening 232 that outputs the sound of the speaker is provided where the second intake duct 131 is provided in the projector in this embodiment. The output opening 232 is for outputting the sound of the speaker. The cross-sectional area of the output opening 232 is less than 300 mm² and slightly larger than the speaker. In addition, in the conventional projectors, the first intake duct 84 does not include the dustproof filter 84*a*.

As described above, in the conventional projectors, the ratio between outside air drawn in through the first intake duct 84 and outside air drawn in through the output opening is 9-1, and 90% of outside air is drawn in through the first intake duct 84.

In the conventional projectors shown in FIGS. 20A and 20B, the inventor made an improvement that increases electric power supplied to the light source 61 in order to improve the brightness of the projection images. However, as the electric power supplied to the light source 61 increases, the heating value of the light source 61 and the power supply 80 increases too. If the heating value of the light source 61 increases, the temperature of the air after cooling the light source 61 that flows into the space surrounded by the power supply 80 becomes high. In addition, since the temperature of the atmosphere in the apparatus rises too, the outside air drawn in through the first intake duct 84 is heated in flowing into the space surrounded by the power supply 80. As a result, it is impossible to cool the power supply 80 optimally, and the electric power supplied to the light source 61 becomes unstable.

To cope with that issue, it can be considered that the amount of outside air drawn in through the first intake duct 84 is increased by increasing the rotation speed of the exhaust fan 86. However, in this case, wind noise of the exhaust fan 86 becomes louder, and that results in making the apparatus noise louder. In addition, if the amount of outside air drawn into the apparatus increases, the amount of dusts that enters into the apparatus increases too. As described above, there is the gap between the lower part of the curved mirror 42 and the lens holder 32 to ensure the layout space of the idler gear 35 that engages with the focus gear 36 of the projection lens unit 31. Consequently, a part of outside air that moves to the power supply 80 drawn in through the first intake duct 84 along with the mirror mount 45 and the backside of the curved mirror 42 flows into the gap between the lower part of the curved mirror 42 and the lens holder 32. If the amount of outside air taken though the first intake duct 84 increases, the amount of outside air that flows into the second projection optical system 40 increases too. As a result, the amount of dust that flows into the second optical system along with the outside air increases, and it is highly possible that the dust attaches to the curved mirror 42 and the reflecting mirror 41 etc. If the dust attaches to the curved mirror 42 and the reflecting mirror 41 etc., the quality of the projection images becomes deteriorated.

Figure 21A:
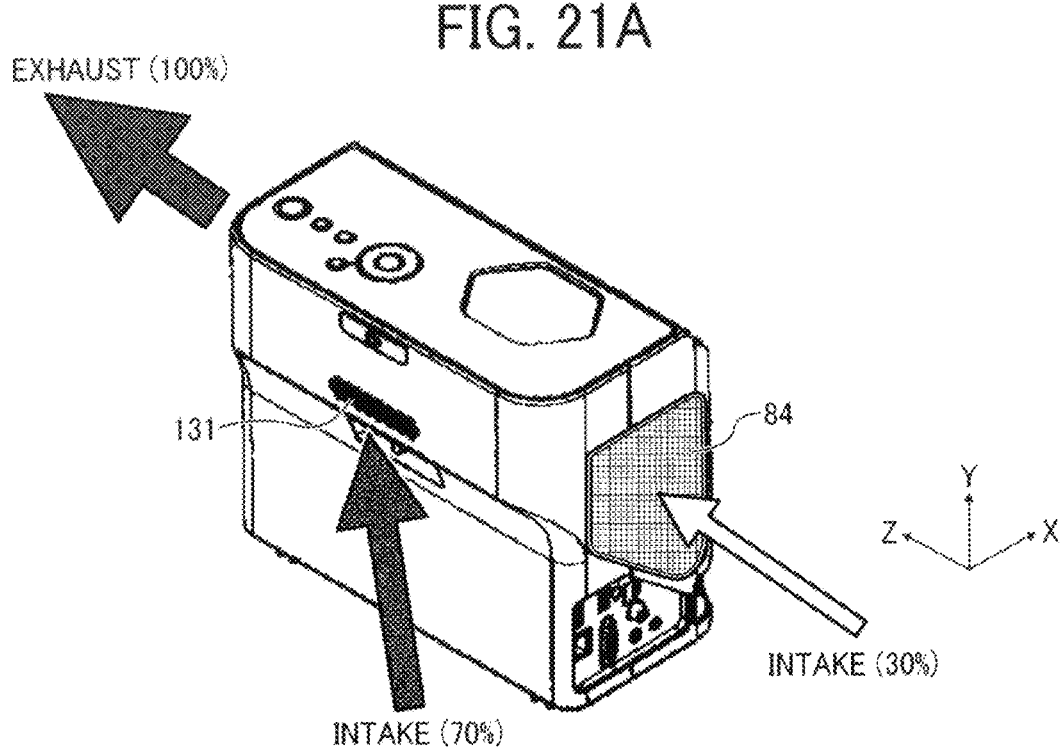
FIGS. 21A and 21B are perspective diagrams illustrating the projector in this embodiment explaining breathing outside air.
Figure 21B:
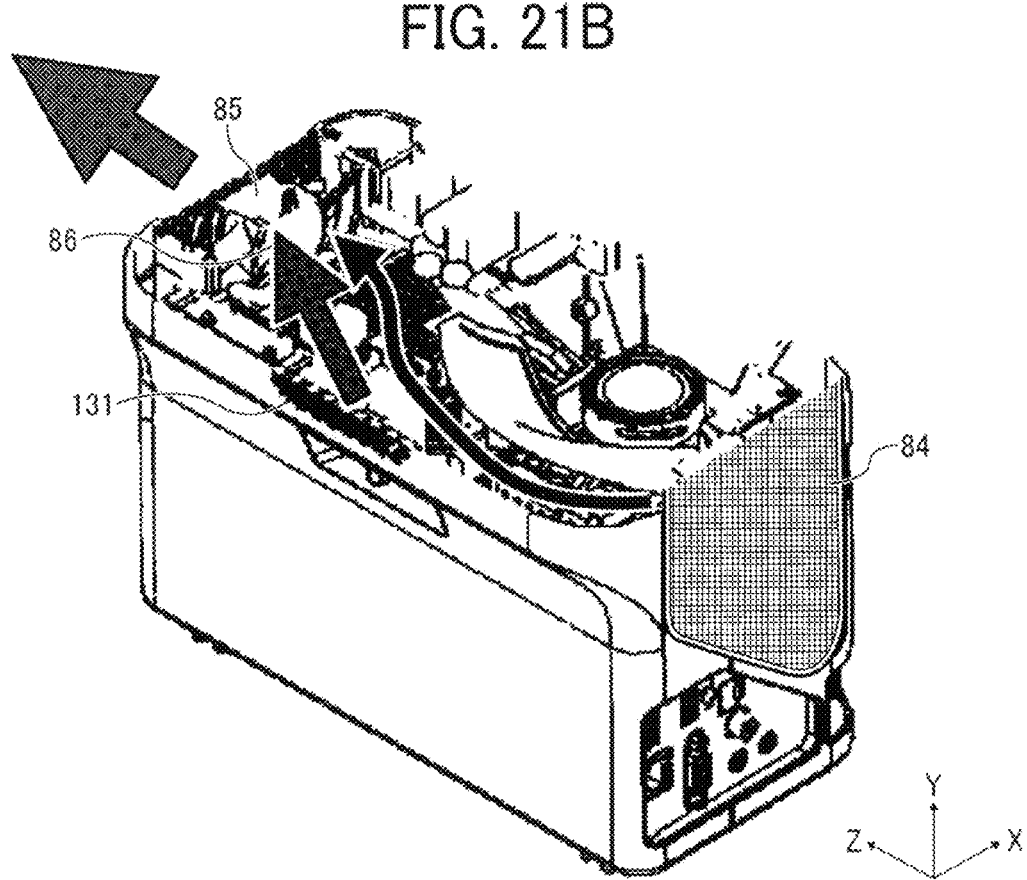
Figure 22:
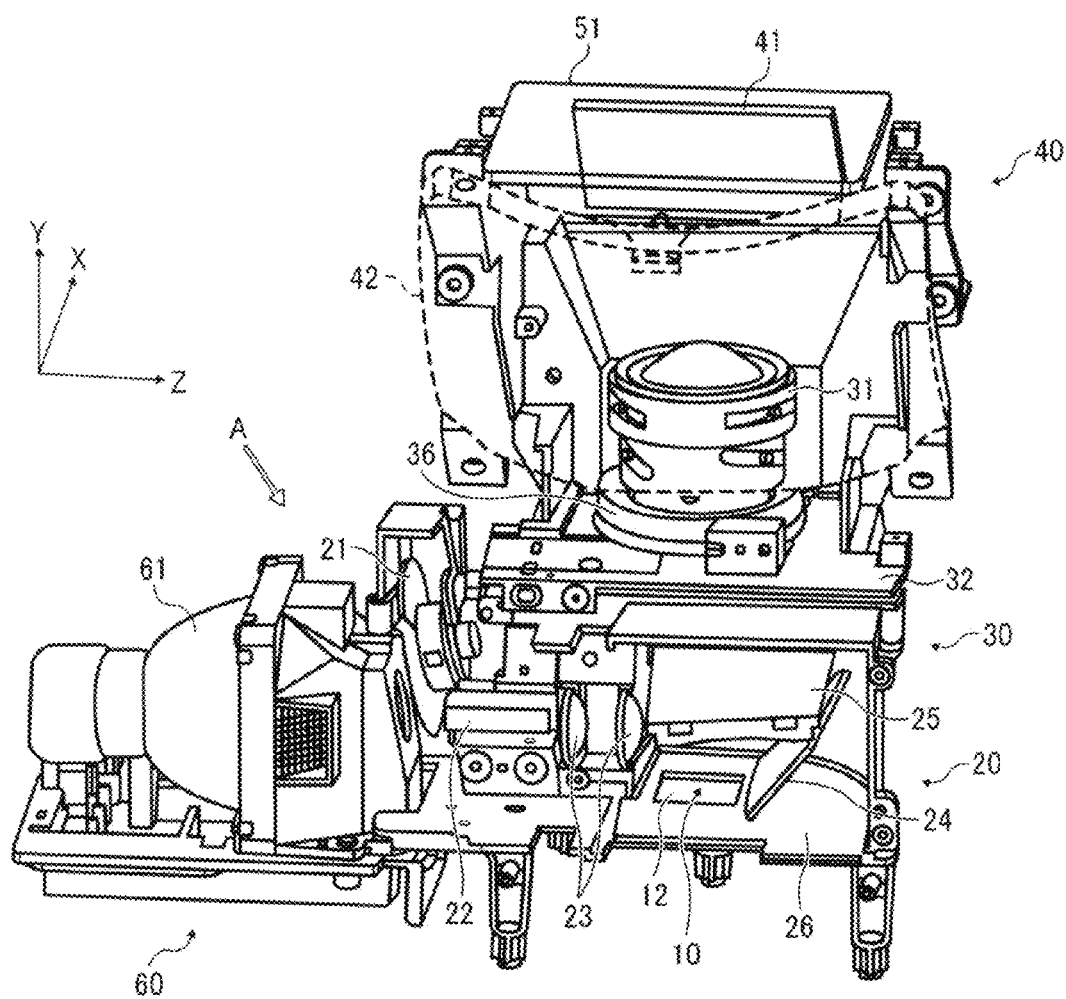
FIG. 22 is a schematic perspective diagram illustrating an internal configuration of a conventional projector.
Figure 23:
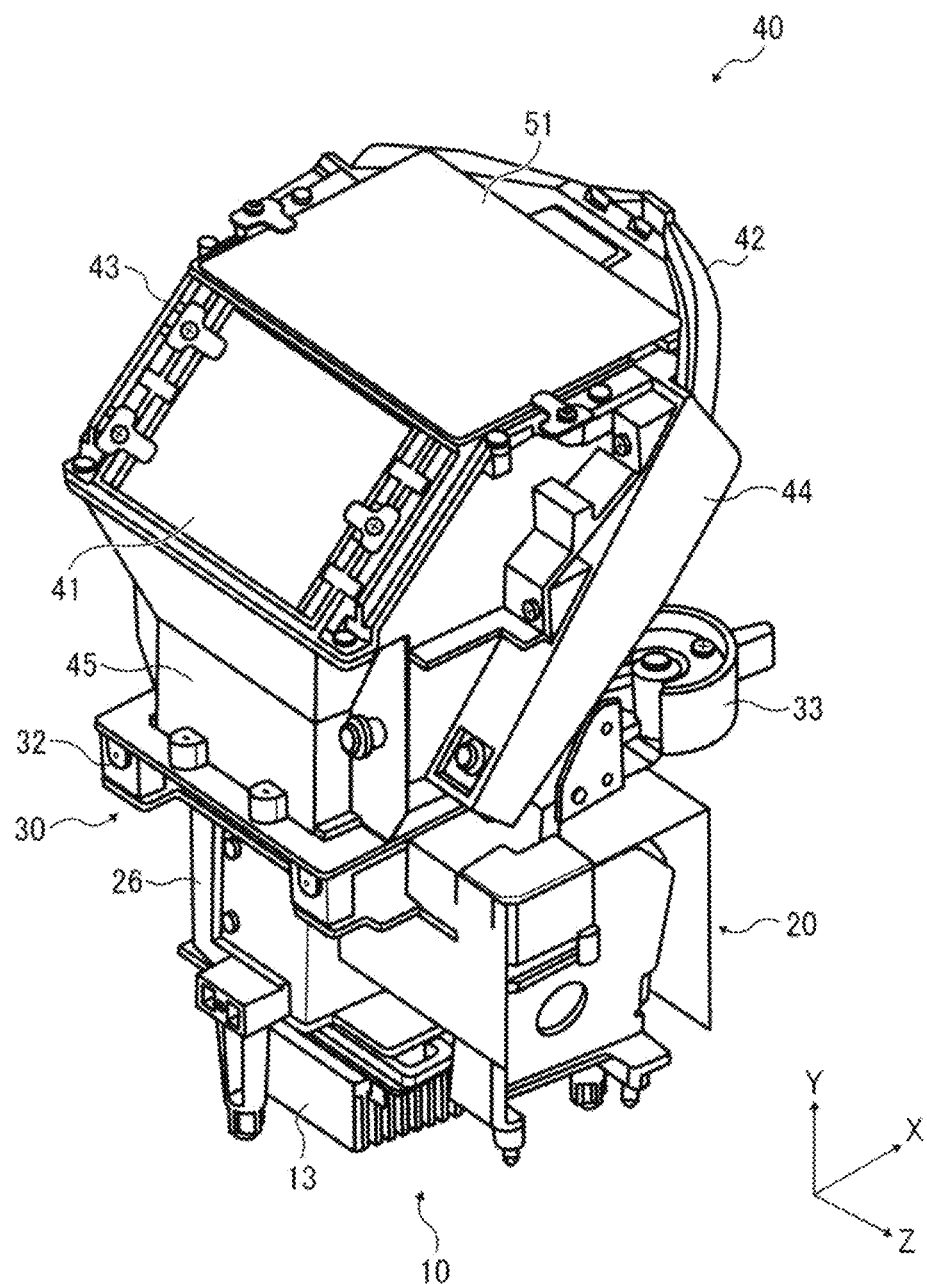
FIG. 23 is a perspective diagram illustrating a light modulator, a lighting unit, a first projection optical system, and a second projection optical system in the conventional projector.
Figure 24:
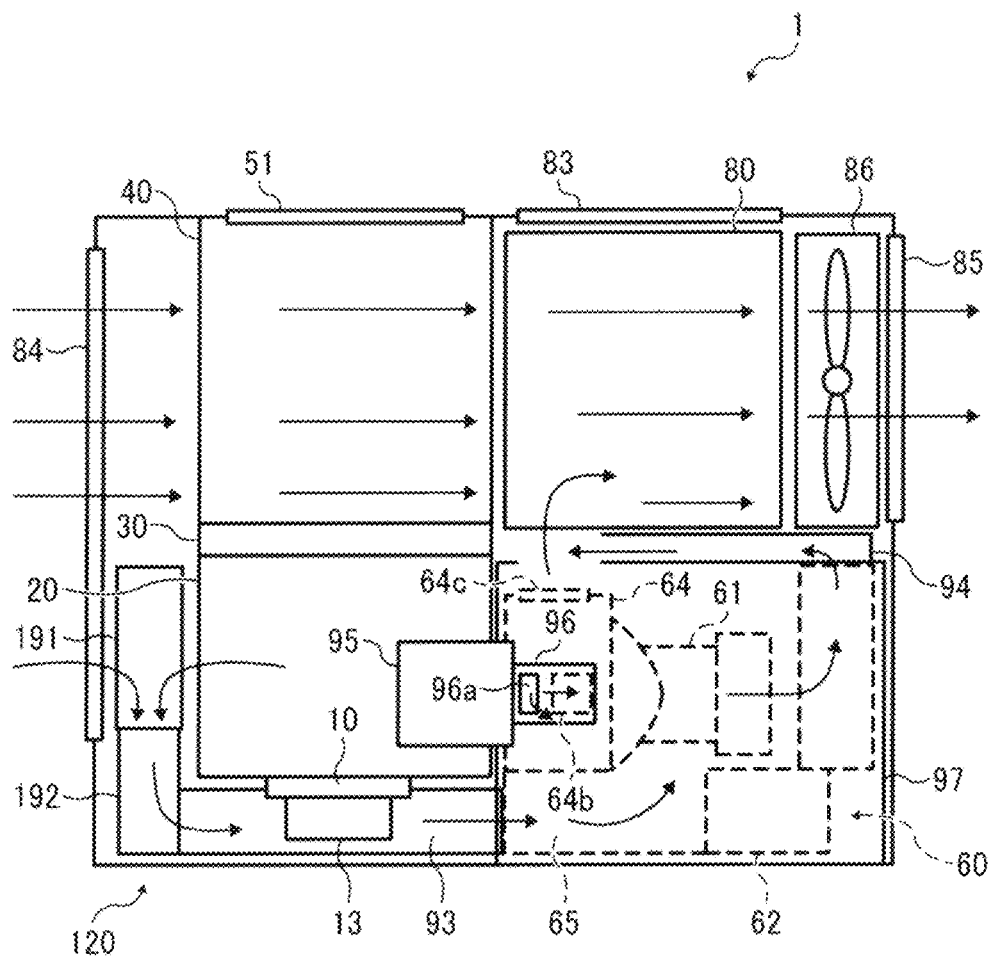
FIG. 24 is an elevational diagram illustrating airflow in the conventional projector.

FIG. 21A is a perspective diagram illustrating the projector in this embodiment explaining breathing outside air. FIG. 21B is a cross-sectional diagram illustrating the projector in this embodiment explaining breathing outside air cut in the direction perpendicular to the y direction. In the projector in this embodiment, the second intake duct 131 whose total cross-sectional area is larger than 300 mm² is provided where the output opening 232 is provided in the conventional projectors, and the first intake duct 84 includes the dustproof filter 84*a*. By laying out the second intake duct 131 whose total cross-sectional area is larger than 300 mm², it is possible to take the outside air through the second intake duct 131 actively. In addition, since the first intake duct 84 includes the dustproof filter 84*a*, the dustproof filter 84*a* intercepts airflow, and the amount of outside air drawn in through the first intake duct 84 decreases. As a result, in this embodiment, 70% of outside air is drawn in through the second intake duct 131, and 30% of outside air is drawn in through the first intake duct 84. Consequently, the amount of outside air drawn in through the second intake duct 131 is larger than the amount of outside air drawn in through the first intake duct 84. Moving distance toward the power supply 80 inside the apparatus of the outside air drawn in through the second intake duct 131 is shorter than the outside air drawn in through the first intake duct 84. As a result, the outside air drawn in through the second intake duct 131 can be prevented from becoming high-temperature compared to the outside air drawn in through the first intake duct 84. Consequently, it is possible to flow low-temperature outside air into the power supply 80 compared to the case that the outside air is flowed to the power supply 80 through the first intake duct 84. Furthermore, the amount of outside air that flows from the second intake duct 131 to the power supply 80 is larger than the amount of outside air that flows from the first intake duct 84. Consequently, it is possible to cool the power supply 80 optimally. As a result, if the heating value of the power supply 80 and the light source 61 increases by increasing electric power supplied to the light source 61 in order to improve the brightness of the projection images, it is possible to cool the power supply optimally. In addition, it is possible to cool the power supply 80 optimally without increasing the amount of air that flows into the power supply 80 by increasing the rotation speed of the exhaust fan 86, and it is possible to reduce the wind noise that the exhaust fan 86 generates.

The outside air drawn in through the first intake duct 84 flows into the apparatus though the dustproof filter 84a. Therefore, the outside air drawn in through the first intake duct 84 seldom includes dust. Consequently, even if the part of the outside air drawn in through the first intake duct 84 flows into the second projection optical system 40 through the gap between the lower part of the curved mirror 42 and the lens holder 32, it is possible to prevent dust from attaching to the curved mirror 42 and the reflecting mirror 41. As a result, it is possible to keep projecting high-quality projection images on the projection surface 2 for a long period of time.

The second intake duct 131 is provided opposed around the center of the backside of the curved mirror in the y direction. Therefore, it is possible to prevent the outside air drawn in through the second intake duct 131 from flowing into the second projection optical system 40 though the gaps between the lower part of the curved mirror 42 and the lens holder 32 and between the upper part of the curved mirror 42 and the connecting part 44b of the free mirror bracket 44. Consequently, it is possible to prevent the dust included in the outside air drawn in through the second intake duct 131 from attaching to the curved mirror 42 and the reflecting mirror 41.

In this embodiment, the intake duct for cooling the DMD 92 is provided on the base part 53 on the case of the projector opposed to the DMD 12. Consequently, the outside air drawn in through the intake duct for cooling the DMD 92 flows into the DMD 12 directly. As a result, it is possible to cool the DMD 12 without heating the outside air by the inside heat compared to the case in which the outside air flows into the DMD 12 via the duct.

In the present invention, described above is an example, and advantageous effects specific to each of following embodiments are performed.

First Embodiment

In the projector that includes the light source 61, the image forming unit 101 that generates optical images by illuminating the image generating device such as the DMD 12 using the light from the light source 61, the projection optical unit 102 that includes optical parts and projects the optical images, the power supply 80 that supplies power to the light source 61, and the case to contain the light source 61, the image forming unit 101, the projection optical unit 102, and the power supply 80 (in this embodiment, the case comprises the exterior cover 59 and the base part 53 etc.), takes the outside air in through the first intake duct 84 provided on the case, cools the power supply 80 by flowing the taken outside air to the power supply 80 circumventing the projection optical unit 102, and exhausts the air after cooling through the exhaust vent 85 provided on the case, the second intake duct 131 is provided nearby the power supply 80 compared to the first intake duct 84, and the amount of outside air drawn into the case through the second intake duct 131 is larger than the amount of outside air drawn into the case through the first intake duct 84.

In the first embodiment, the flow path of the outside air drawn in through the second intake duct 131 nearby the power supply 80 to the power supply 80 inside the apparatus is shorter than the flow path of the outside air drawn in through the first intake duct 84. Therefore, the outside air drawn in through the second intake duct 131 is not heated by the heat inside the apparatus compared to the outside air drawn in through the first intake duct 84. In addition, the amount of outside air drawn in through the second intake duct 131 is larger than the amount of outside air drawn in through the first intake duct 84. As a result, it is possible to lower the temperature of the outside air flowing to the power supply 80 for cooling the power supply 80 compared to the projector described in JP-2013-097340-A that takes almost all of the outside air for cooling the power supply 80 in through the first intake duct 84. Consequently, it is possible to cool the power supply 80 optimally even if the brightness of the projection image is increased. As a result, it is possible to cool the power supply 80 optimally without increasing the rotating speed of the exhaust fan 86 and reduce the wind noise by the exhaust fan 86.

Second Embodiment

In the first embodiment, the total opening cross-section of the second intake duct 131 is larger than 300 mm$^2$.

In the configuration described above, as described before, it is possible to take the outside air through the second intake duct 131 optimally.

Third Embodiment

In either the first embodiment or the second embodiment, in case of viewing the projector 1 from the viewpoint perpendicular to the light emitting direction of the light source 61 and the optical image emitting direction of the image generating device so that the optical image emitting direction of the image generating device such as the DMD 12 etc. becomes vertical, the exhaust vent 85 is provided on one end of the case, and the first intake duct 84 is provided on the other end of the case in the horizontal direction. The power supply 80 is provided above the image forming unit 101 on one end in the horizontal direction, the exhaust fan 86 is provided between the power supply 80 and the exhaust vent 85, and the second intake duct 131 is provided upstream compared to the power supply 80.

In the configuration described above, it is possible to take the outside air through the intake ducts 84 and 131 using the exhaust fan 86 and flow the taken outside air to the power supply 80. In addition, it is possible to prevent the outside air drawn in through the intake duct 84 and 131 from flowing into the image forming unit 101, and it is possible to prevent dust included in the outside air from attaching to the image generating device such as the DMD 12 and the optical parts such as the relay lens that the image forming unit 101 includes.

Fourth Embodiment

In one of the first embodiment, the second embodiment, and the third embodiment, the projection optical unit 102 includes the reflecting mirror 41 and the sculptured surface mirror 42, and the second intake duct 131 is provided on the case opposite to the backside of the sculptured surface mirror 42.

In the configuration described above, it is possible to flow the outside air drawn in through the second intake duct 131 to the power supply 80 via the gap between the backside of the sculptured surface mirror 42 and the case. In addition, it is possible to factor the light path of the image formation light that forms the image to be projected into the apparatus using the reflecting mirror 41 and the sculptured surface mirror 42, and it is possible to shorten the mounting distance to the projection surface 2.

Fifth Embodiment

In one of the first embodiment, the second embodiment, the third embodiment, and the fourth embodiment, the speaker 140 is provided opposite to the second intake duct 131.

In the configuration described above, as described above, it is possible to reduce the opening part provided on the exterior case 59 compared to the configuration that the sound output opening is provided other than the second intake duct 131 Consequently, it is possible to prevent design of the projector 1 from deteriorating.

Sixth Embodiment

In one of the first embodiment, the second embodiment, the third embodiment, the fourth embodiment, and the fifth embodiment, the first intake duct 84 includes the dustproof filter 84*a*.

In the configuration described above, as described above, it is possible that the outside air taken in the apparatus through the first intake duct 84 seldom includes dust. Consequently, even if the part of the outside air drawn in through the first intake duct 84 flows into the projection optical unit 102, it is possible to prevent dust from attaching to the optical devices such as the curved mirror 42 and the reflecting mirror 41. As a result, it is possible to keep projecting high-quality projection images on the projection surface 2 for a long period of time.

In addition, since the first intake duct 84 includes the dustproof filter 84*a*, the dustproof filter 84*a* intercepts the airflow, and the amount of outside air drawn in through the first intake duct 84 is reduced. As a result, it is possible to increase the amount of outside air drawn in through the second intake duct 131 more than the amount of outside air drawn in through the first intake duct 84.

Numerous additional modifications and variations are possible in light of the above teachings. It is therefore to be understood that, within the scope of the appended claims, the disclosure of this patent specification may be practiced otherwise than as specifically described herein.

What is claimed is:

1. A projector, comprising:
   a light source;
   an image forming unit to illuminate an image generating device with light emitted from the light source to generate an optical image;
   a projection optical unit including optical devices to project the optical image generated by the image forming unit;
   a power supply to supply electric power to the light source;
   a case that contains the light source, the image forming unit, the projection optical unit, and the power supply;
   a first intake duct provided in the case; and
   a second intake duct provided in the case, the second intake duct being closer to the power supply than the first intake duct,
   wherein the projector takes outside air in the case through the first intake duct provided on the case, cools the power supply by circulating the taken outside air to the power supply circumventing the projection optical unit, and exhausts the air after cooling through an exhaust vent provided on the case, and an amount of outside air drawn into the case through the second intake duct is larger than an amount of outside air drawn into the case through the first intake duct.

2. The projector according to claim 1, wherein the total cross-sectional area of the second intake duct opening is larger than 300 mm$^2$.

3. The projector according to claim 1, wherein the exhaust vent is provided in a first surface of the case and the first intake duct is provided in a second surface of the case adjacent to the first surface, the power supply is provided above the image forming unit behind the first surface, an exhaust fan is disposed between the power supply and the exhaust vent, and the second intake duct is provided upstream from the power supply.

4. The projector according to claim 1, wherein the projection optical unit includes a reflecting mirror and a sculptured surface mirror, and the second intake duct is provided in the case opposite a backside of the sculptured surface mirror.

5. The projector according to claim 1, wherein a speaker is provided behind the second intake duct.

6. The projector according to claim 1, further comprising a dustproof filter on the first intake duct.

7. The projector according to claim 1, wherein the first intake duct is provided on a first surface of the case, the exhaust vent is provided on a second surface of the case, and the second intake duct is provided on a third surface of the case, the third surface of the case connecting the first and second surfaces of the case.

* * * * *